United States Patent
Cole et al.

(10) Patent No.: US 10,487,978 B2
(45) Date of Patent: Nov. 26, 2019

(54) RAIL MOUNTED ASSEMBLY AND METHOD OF SECURING AND RELEASING COMPONENTS OF THE ASSEMBLY

(71) Applicant: Sun Hydraulics, LLC, Sarasota, FL (US)

(72) Inventors: Chris Cole, Spring Branch, TX (US); Curt Rainbolt, Broken Arrow, OK (US); Jake Holloway, Owasso, OK (US); Lowell Bonner, Broken Arrow, OK (US)

(73) Assignee: Sun Hydraulics, LLC, Sarasota, FL (US)

( * ) Notice: Subject to any disclaimer, the term of this patent is extended or adjusted under 35 U.S.C. 154(b) by 42 days.

(21) Appl. No.: 15/704,742

(22) Filed: Sep. 14, 2017

(65) Prior Publication Data
US 2019/0078731 A1 Mar. 14, 2019

(51) Int. Cl.
*F16M 13/00* (2006.01)
*F16M 13/02* (2006.01)
*F16K 31/06* (2006.01)

(52) U.S. Cl.
CPC ............. *F16M 13/02* (2013.01); *F16K 31/06* (2013.01)

(58) Field of Classification Search
CPC ...... F16M 13/00; A47F 5/0838; A47F 5/0853
USPC .............. 248/220.21, 220.22, 224.7, 224.51, 248/224.61, 223.31
See application file for complete search history.

(56) References Cited

U.S. PATENT DOCUMENTS

| | | | | |
|---|---|---|---|---|
| 4,733,330 A * | 3/1988 | Tanaka | ................... | H02G 3/121 174/58 |
| 5,740,995 A * | 4/1998 | Richter | ................... | B60N 3/101 248/207 |
| 8,448,829 B2 * | 5/2013 | Watanabe | ............. | H05K 5/0204 224/545 |
| 9,581,416 B1 * | 2/2017 | Yim | ....................... | F41G 11/003 |
| 9,810,911 B2 * | 11/2017 | Miller | ................... | H05K 999/99 |
| 2009/0256040 A1 * | 10/2009 | Lee | ......................... | F16M 13/02 248/224.61 |
| 2014/0110546 A1 * | 4/2014 | Senatori | .................. | G06F 1/186 248/220.21 |
| 2015/0102191 A1 * | 4/2015 | Lee | ........................ | H05K 7/1421 248/220.21 |

* cited by examiner

*Primary Examiner* — Steven M Marsh
(74) *Attorney, Agent, or Firm* — McDonnell Boehnen Hulbert & Berghoff LLP

(57) ABSTRACT

An example rail mounted assembly includes a controller housing having a locking post extending from a base of the controller housing and multiple mounting guides extending from the base and each mounting guide includes a guiding slot, and a rail having two side portions and a center portion therebetween. Each side portion is coupled to a particular side of the center portion and forms an L-shaped edge and each side portion is configured to slide into the guiding slot of a particular mounting guide of the controller housing for coupling the rail to the controller housing. The center portion includes a flexible cutout tab with a hole for sliding over and engaging with the locking post when coupling the rail to the controller housing to lock the rail to the controller housing. Example methods of securing and releasing components of the rail mounted assembly are also described.

20 Claims, 16 Drawing Sheets

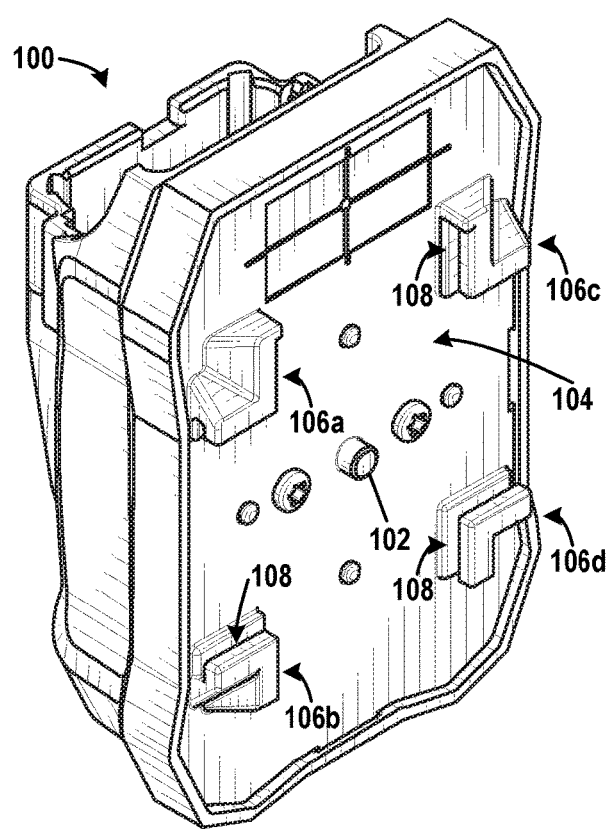
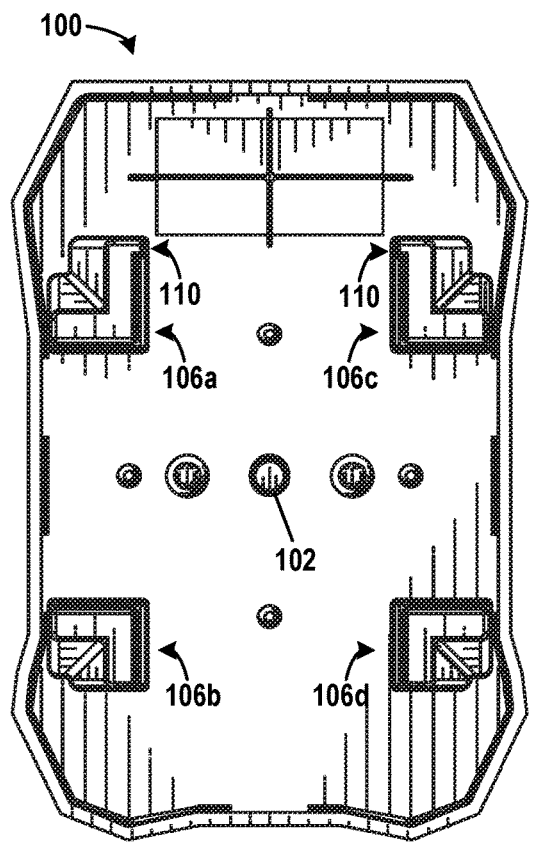
FIG. 1
FIG. 2
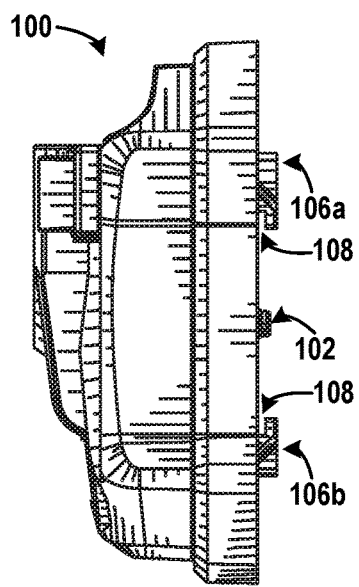
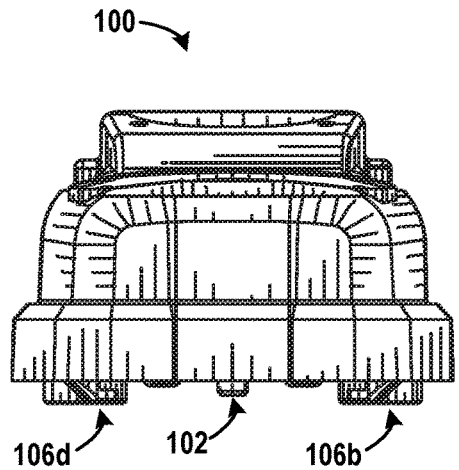
FIG. 3
FIG. 4

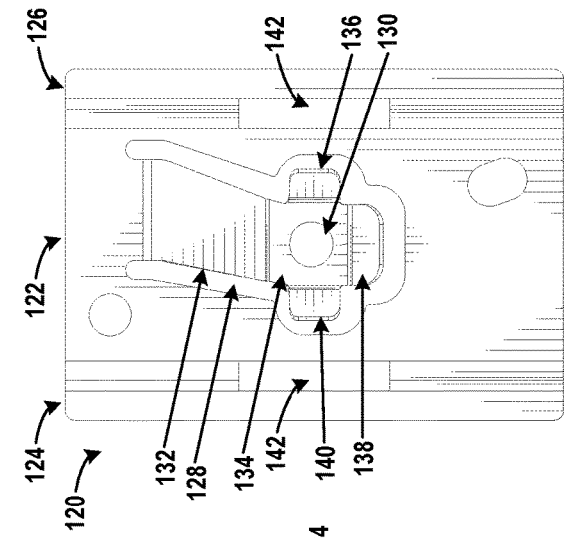
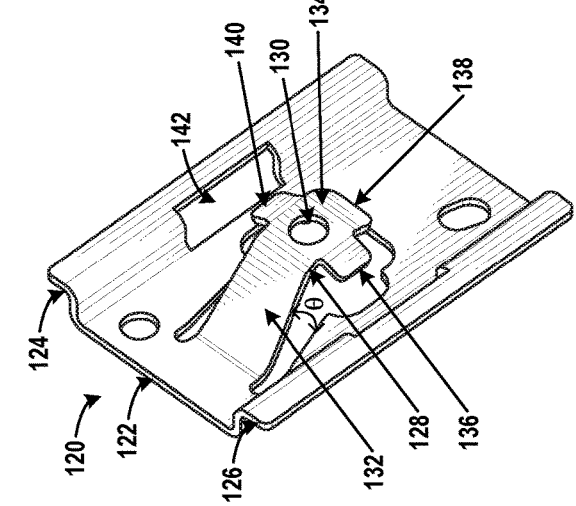
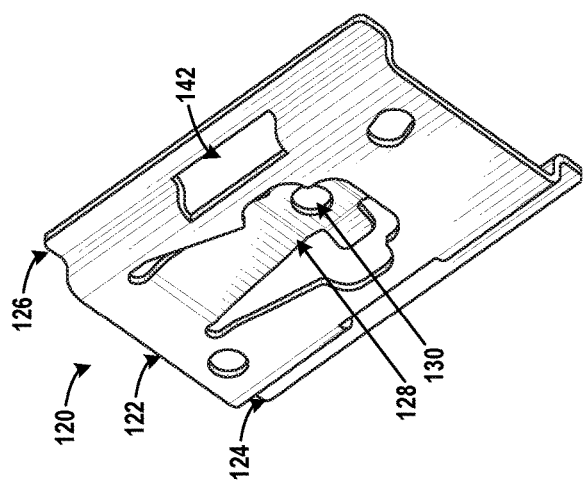
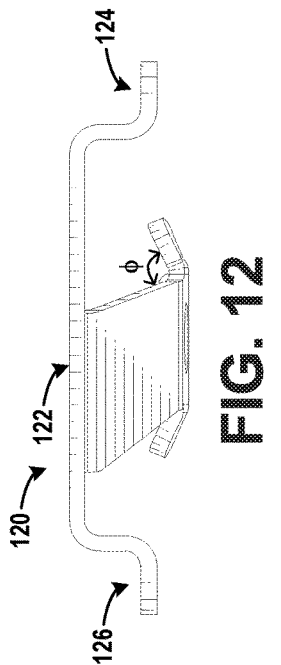
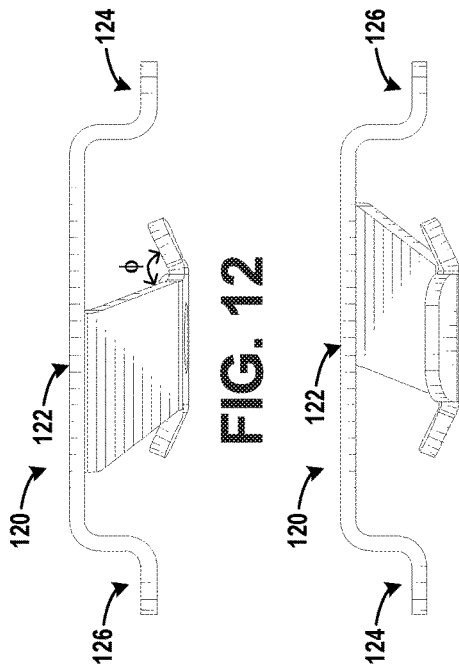
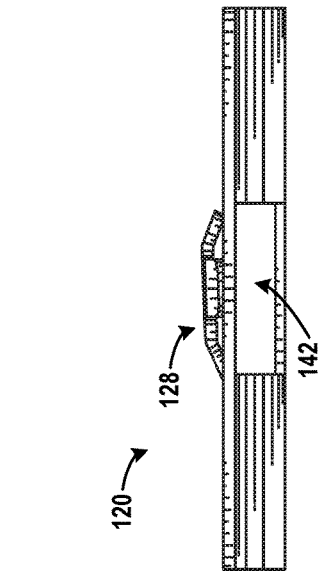

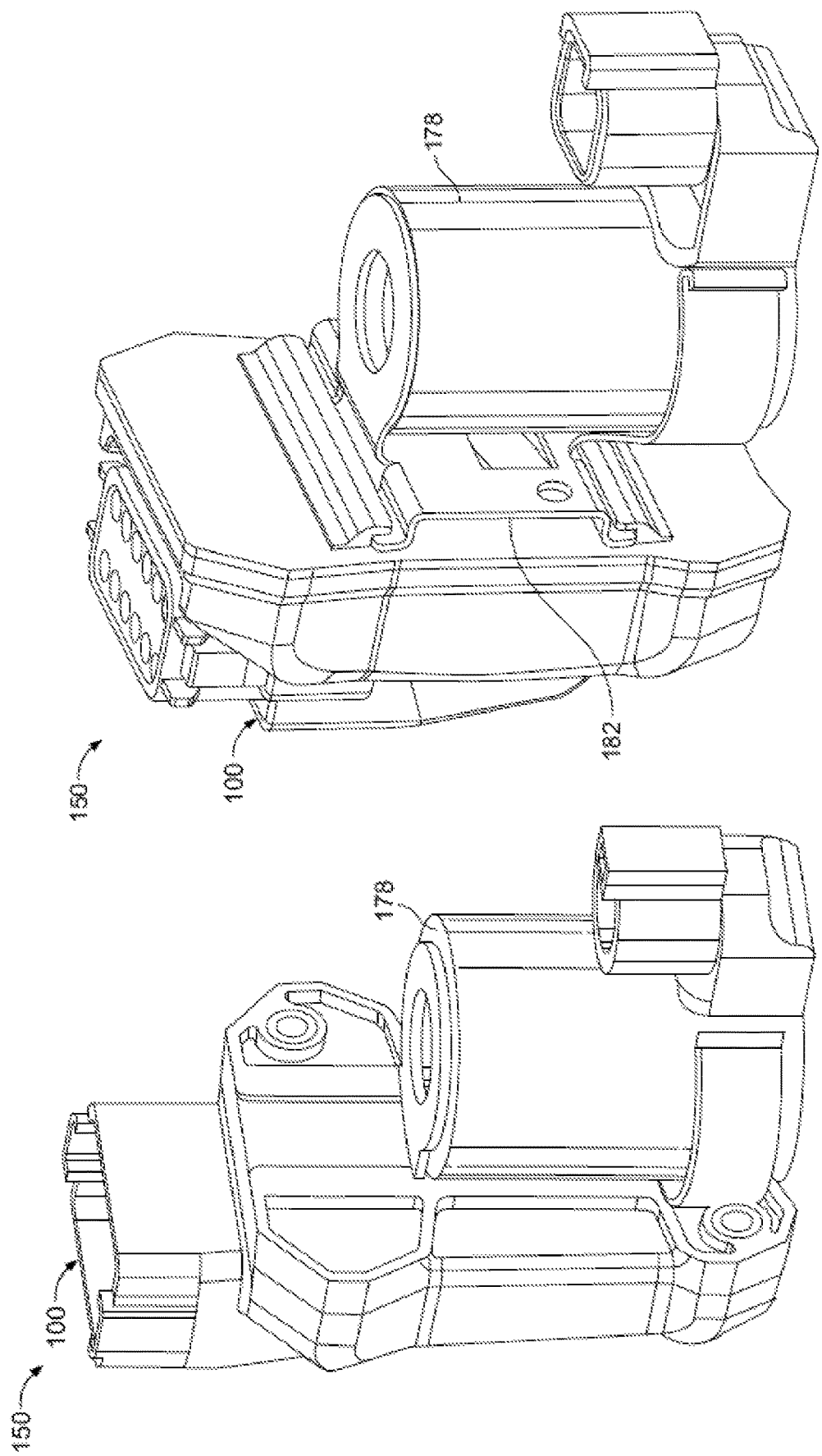

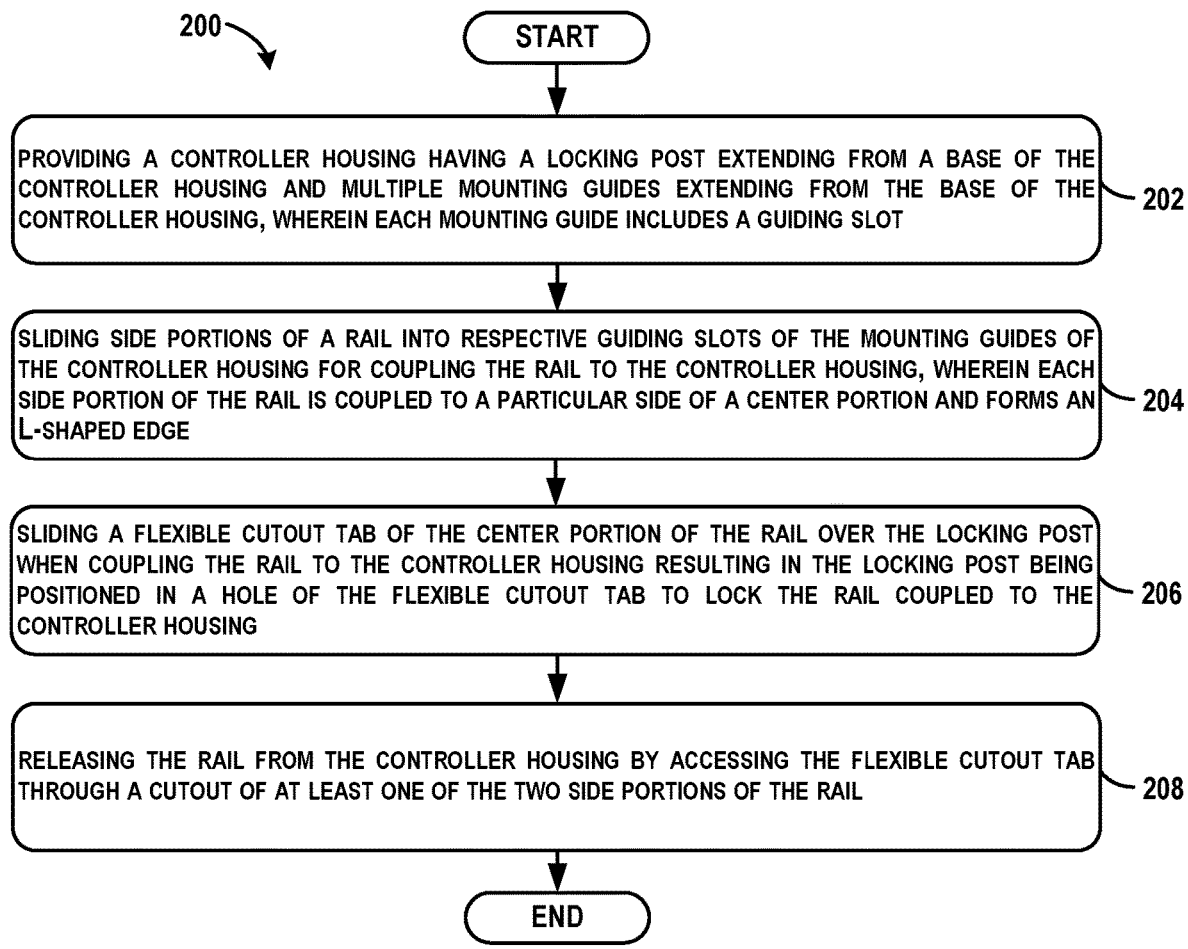
FIG. 37
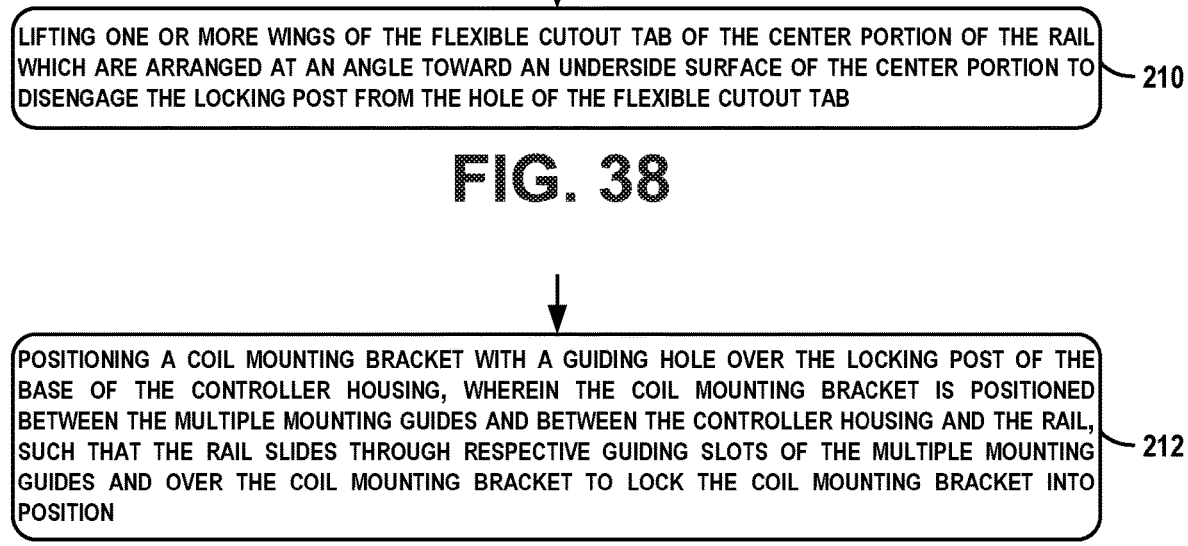
FIG. 38
FIG. 39

RAIL MOUNTED ASSEMBLY AND METHOD OF SECURING AND RELEASING COMPONENTS OF THE ASSEMBLY

FIELD

The present disclosure generally relates to a rail mounted assembly, and more particularly, to a rail mounted assembly for mounting a coil to a valve driver for use in various hydraulic valve arrangements.

BACKGROUND

Many hydraulic valves used on mobile equipment and industrial fluid power automation systems are controlled by electronic driver components. Such electronic driver components include electrical interfaces between an electronic controller (or valve driver) and the valve. The electronic driver components also typically include a solenoid coil as part of the electrical interface.

Existing valve drivers typically have the electronic controller and the solenoid coil positioned separately and electrically connected to each other through wires. However, in many automation systems, it is preferable to reduce an amount of exposed wires to make the systems less susceptible to failure as a result of moving parts interfering with the wires. In addition, reducing an amount of wiring can make the system less complex, and cheaper.

Thus, improvements are needed for new structural mounting designs that enable valve drivers to more easily be integrated into the automation system or mobile equipment, and enable fast and easy removal or replacement of electronic driver components.

SUMMARY

In one example, a rail mounted assembly is described that comprises a controller housing having a locking feature on a base of the controller housing and multiple mounting guides extending from the base of the controller housing. Each mounting guide includes a guiding slot. The rail mounted assembly also comprises a rail having two side portions and a center portion therebetween, and each side portion is coupled to a particular side of the center portion and forms an L-shaped edge. Each side portion is configured to slide into the guiding slot of a particular mounting guide of the controller housing for coupling the rail to the controller housing, and the center portion also includes a flexible cutout tab for sliding over and engaging with the locking feature when coupling the rail to the controller housing resulting in the locking feature being aligned with the flexible cutout tab to lock the rail coupled to the controller housing.

In another example, a rail for a mounted assembly is described comprising a center portion including a flexible cutout tab with a hole for sliding over a locking post when coupling the rail to a controller housing to lock the rail coupled to the controller housing. The flexible cutout tab of the center portion includes (i) an angled portion arranged at an angle away from an underside surface of the center portion, (ii) a flat tab including the hole for sliding over the locking post, wherein the flat tab is connected to an end of the angled portion, and (iii) one or more wings connected to the flat tab and arranged at an angle toward the underside surface of the center portion. The center portion is releasable from the controller housing by lifting the one or more wings to disengage the locking post from the hole of the flexible cutout tab. The rail also includes two side portions, and each side portion is coupled to a particular side of the center portion and forms an L-shaped edge. Each side portion is configured to slide into a guiding slot of a particular mounting guide of the controller housing for coupling the rail to the controller housing, and at least one of the two side portions of the rail includes a cutout enabling access to the flexible cutout tab.

In another example, a method of securing and releasing components of a rail mounted assembly is described. The method comprises providing a controller housing having a locking post extending from a base of the controller housing and multiple mounting guides extending from the base of the controller housing, and each mounting guide includes a guiding slot. The method also includes sliding side portions of a rail into respective guiding slots of the mounting guides of the controller housing for coupling the rail to the controller housing, and each side portion of the rail is coupled to a particular side of a center portion and forms an L-shaped edge. The method also includes sliding a flexible cutout tab of the center portion of the rail over the locking post when coupling the rail to the controller housing resulting in the locking post being positioned in a hole of the flexible cutout tab to lock the rail coupled to the controller housing, and releasing the rail from the controller housing by accessing the flexible cutout tab through a cutout of at least one of the two side portions of the rail.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

FIG. 1 illustrate a downward perspective view from a right rear corner of a controller housing, according to an example implementation.

FIG. 2 is a rear elevational view of the controller housing, according to an example implementation.

FIG. 3 is a right side elevational view of the controller housing, according to an example implementation.

FIG. 4 is bottom plan view of the controller housing, according to an example implementation.

FIG. 8 is a downward perspective view from a left rear corner of the rail, according to an example implementation.

FIG. 9 is an upward perspective view from a right rear corner of the rail, according to an example implementation.

FIG. 10 is top plan view of the rail, according to an example implementation.

FIG. 11 is a front elevational view of the rail, according to an example implementation.

FIG. 12 is a right side elevational view of the rail, according to an example implementation.

FIG. 13 is a left side elevational view of the rail, according to an example implementation.

FIG. 35 illustrates a side view of the rail mounted assembly with the integral component inserted, according to an example embodiment.

FIG. 36 illustrates a side view of the rail mounted assembly with the integral component inserted, according to an example embodiment.

FIG. 37 shows a flowchart of an example method of securing and releasing components of the rail mounted assembly, according to an example implementation.

FIG. 38 shows a flowchart of additional functions that may be executed and performed with the method of securing and releasing components of the rail mounted assembly, according to an example implementation.

FIG. 39 shows a flowchart of additional functions that may be executed and performed with the method of securing and releasing components of the rail mounted assembly, according to an example implementation.

DETAILED DESCRIPTION

Figure 5:
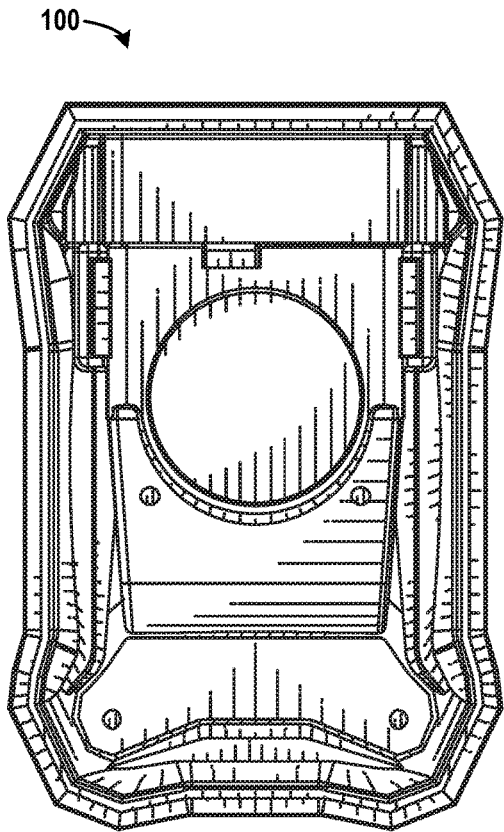
FIG. 5 is a front elevational view of the controller housing according to, an example implementation.

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Within examples described herein, a rail for a mounted assembly includes a center portion and two side portions. The center portion includes a flexible cutout tab with a hole for sliding over a locking post when coupling the rail to a controller housing to lock the rail coupled to the controller housing, and the flexible cutout tab of the center portion includes (i) an angled portion arranged at an angle away from an underside surface of the center portion, (ii) a flat tab including the hole for sliding over the locking the post, and (iii) one or more wings connected to the flat tab and arranged at an angle toward the underside surface of the center portion. The center portion is releasable from the controller housing by lifting the one or more wings to disengage the locking post from the hole of the flexible cutout tab. The two side portions are each coupled to a particular side of the center portion and form an L-shaped edge, and each side portion is configured to slide into a guiding slot of a particular mounting guide of the controller housing for coupling the rail to the controller housing. At least one of the two side portions of the rail includes a cutout enabling access to the flexible cutout tab.

Additionally, described herein is a rail mounted assembly is described including a controller housing that has a locking feature (e.g., a post or hole) extending from a base of the controller housing and multiple mounting guides extending from the base of the controller housing. The rail mounted assembly also includes a rail that has two side portions and a center portion therebetween, and each side portion is coupled to a particular side of the center portion and forms an L-shaped edge. Each side portion is configured to slide into a guiding slot of a particular mounting guide of the controller housing for coupling the rail to the controller housing. The center portion of the rail includes a flexible cutout tab for sliding over and engaging with the locking feature when coupling the rail to the controller housing resulting in the locking feature being aligned with the flexible cutout tab to lock the rail coupled to the controller housing.

In some examples, the rail mounted assembly also includes a coil mounting bracket with a guiding hole positioned over the locking feature of the base of the controller housing, and the coil mounting bracket is positioned between the multiple mounting guides. The coil mounting assembly can hold a solenoid valve coil, for example, such that the rail mounted assembly enables a coil-mounted valve driver configuration.

Also described herein is a method of securing and releasing components of a rail mounted assembly, for example.

Referring now to the figures, FIG. 1 illustrates a downward perspective view from a right rear corner of a controller housing 100, according to an example implementation. The controller housing 100 has a locking post 102 extending from a base 104 of the controller housing 100 and multiple mounting guides 106a-d extending from the base 104.

The controller housing 100 may comprise plastic, metal, or a combination of materials.

The locking post 102 may be a locking feature to engage and secure a mounting component. In the example shown in FIG. 1, the locking feature is the post 102. In other examples, the locking feature can include a hole or opening for accepting a corresponding post on the mounting component. Still further, the locking feature can include an inclined/declined surface over which a tab of a mounting component snaps into place.

Each mounting guide 106a-d includes a guiding slot 108. The respective guiding slots conform to the Deutsches Institut für Normung (DIN) standard, according to an example implementation. A DIN slot or DIN rail is a rail or track that permits movement of a mounted component along the DIN rail or removal of the mounted component from the DIN rail by a sliding motion. The guiding slot 108 may be a rectangular form for accepting a rectangular (or correspondingly shaped) railing, for example.

Within examples, each mounting guide 106a-d includes two portions coupled together in an L-shape and each of the two portions includes a respective guiding slot 108. As shown in FIG. 1, the multiple mounting guides 106a-d can include at least four mounting guides arranged at corners of a square or rectangular configuration, and the multiple mounting guides 106a-d enable a mounting component (e.g., a rail as described below) to couple to the controller housing 100 in either of a lateral direction and a longitudinal direction (e.g., horizontal or vertical direction). For example, each of the two portions of the L-shaped mounting guides 106a-d includes a respective guiding slot 108, and thus, the multiple mounting guides 106a-d enable a rail to couple to the controller housing 100 in either of a lateral direction and a longitudinal direction, and by insertion from any direction, in some examples. In other examples, described below, a rail or other mounting component may be prohibited from insertion in certain directions due to a blocking lip.

FIG. 2 is a rear elevational view of the controller housing 100, according to an example implementation. In FIG. 2, the mounting guides 106a-d are shown arranged in a symmetrical configuration on the base 104 of the controller housing 100. FIG. 2 illustrates that two of the mounting guides 106a and 106c have a blocking lip 110 such that the rail is permitted to slide laterally from either direction, and longitudinally from only one direction (e.g., in this configuration upward into the controller housing 100). The blocking lip 110 may alternatively be positioned on any two adjacent mounting guides 106a-d so as to prevent insertion of a mounting component in any one direction, for example.

FIG. 3 is a right side elevational view of the controller housing 100, according to an example implementation. With the symmetrical arrangement of the mounting guides 106a-d as shown in FIG. 2, a left side elevational view is a mirror image of the right side elevational view. In FIG. 3, the guiding slot 108 is shown for the mounting guides 106a and 106c, and together the two mounting guides 106a and 106c with associated guiding slots 108 can accommodate (or operate as a receptacle for) a DIN rail, for example.

FIG. 4 is bottom plan view of the controller housing 100, according to an example implementation. From this view, a mounting component may be inserted directly into the controller housing 100, for example, in a longitudinal direction.

Figure 6:
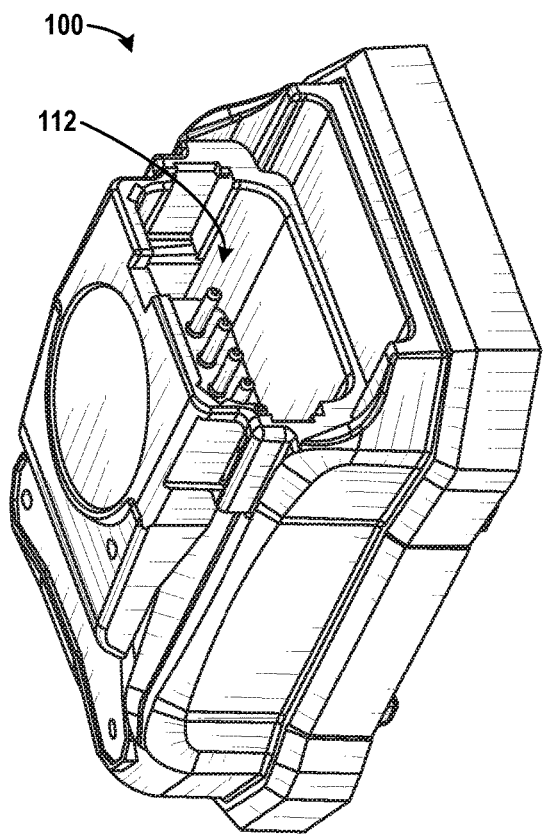
FIG. 6 is a downward perspective view from a right front corner of the controller housing, according to an example implementation.
Figure 7:
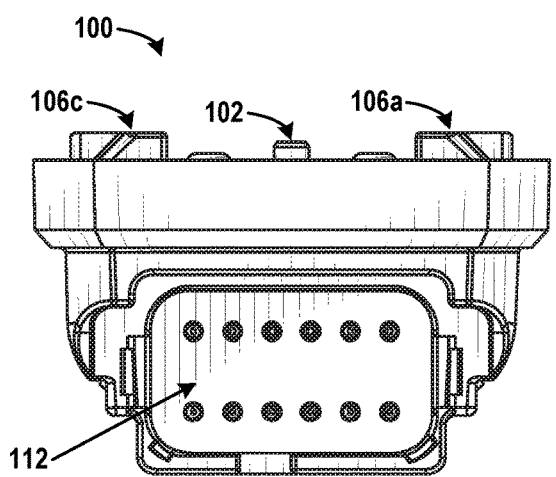
FIG. 7 is top plan view of the controller housing, according to an example implementation.

FIG. 5 is a front elevational view of the controller housing 100 according to an example implementation, FIG. 6 is a downward perspective view from a right front corner of the controller housing 100 according to an example implementation, and FIG. 7 is top plan view of the controller housing 100, according to an example implementation. As shown in FIGS. 6-7, the controller housing 100 includes an electrical connection 112 that may be a twelve (12) pin connector, for example, to enable electrical connection to any electrical component.

The controller housing 100 is a housing or enclosure for electronic components that may be used to control or operate a valve. The electronic components can include a circuit board, wiring, microprocessor, and other electrical circuitry components as well.

Turning to FIGS. 8-13, various views of a rail 120 are shown. The rail 120 is a mounting component that may be inserted into the controller housing 100, for example. FIG. 8 is a downward perspective view from a left rear corner of the rail 120 according to an example implementation, FIG. 9 is an upward perspective view from a right rear corner of the rail 120 according to an example implementation, FIG. 10 is top plan view of the rail 120 according to an example implementation, FIG. 11 is a front elevational view of the rail 120 (e.g., a rear elevational view is a mirror image of the front elevational view) according to an example implementation, FIG. 12 is a right side elevational view of the rail 120 according to an example implementation, and FIG. 13 is a left side elevational view of the rail 120 according to an example implementation.

The rail 120 includes a center portion 122 and two side portions 124 and 126 that are each coupled to a particular side of the center portion 122. The center portion 122 includes a flexible cutout tab 128 with a hole 130 for sliding over the locking post 102 when coupling the rail 120 to the controller housing 100 to lock the rail 120 coupled to the controller housing 100. The flexible cutout tab 128 of the center portion 122 includes (i) an angled portion 132 arranged at an angle θ away from an underside surface of the center portion 122, (ii) a flat tab 134 including the hole 130 for sliding over the locking post 102 that is connected to an end of the angled portion 132, and (iii) one or more wings 136, 138, and 140 connected to the flat tab 134 and arranged at an angle φ toward the underside surface of the center portion 122. The wings 136, 138, and 140 are bent upward toward the underside surface of the center portion 122 while the angled portion 132 is bent downward away from the underside surface of the center portion 122. The center portion 122 is releasable from the controller housing 100 by lifting the one or more wings 136, 138, and 140 to disengage the locking post 102 from the hole 130 of the flexible cutout tab 128 (described more fully below).

The two side portions 124 and 126 are each coupled to a particular side of the center portion 122 and form an L-shaped edge, as shown in FIGS. 12-13, for example. Each side portion 124 and 126 is configured to slide into the guiding slot 108 of a particular mounting guide 106a-d of the controller housing 100 for coupling the rail 120 to the controller housing 100.

Within examples at least one of the two side portions 124 and 126 of the rail 120 includes a cutout 142 enabling access to the flexible cutout tab 128. FIG. 10 illustrates that both of the side portions 124 and 126 include the cutout 142, however, in other examples, only one of the side portions 124 and 126 may include the cutout 142.

The rail 120 may comprise an integral component such that the two side portions 124 and 126, the center portion 122, and the flexible cutout tab 128 of the center portion 122 are all formed from an integral piece of material. The flexible cutout tab 128 is then punched out of the center portion 122, with cutouts made for the hole 130 and the cutout 142, for example. The integral piece of material can be pressed to form the L-shaped edges between the center portion 122 and the two side portions 124 and 126. The two side portions 124 and 126 and the center portion 122 of the rail 120 are configured in a top-hat orientation, as shown in FIGS. 12-13, for example.

Figure 14:
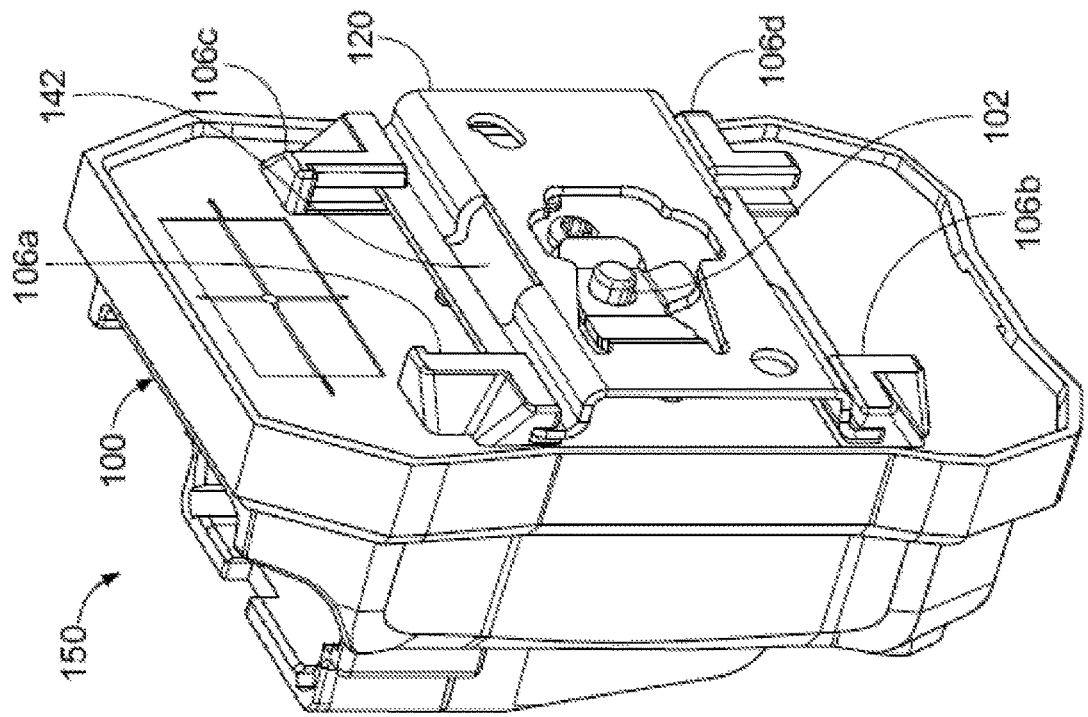
FIG. 14 illustrates a rail mounted assembly and mounting of the rail onto the controller housing, according to example implementations.
Figure 15:
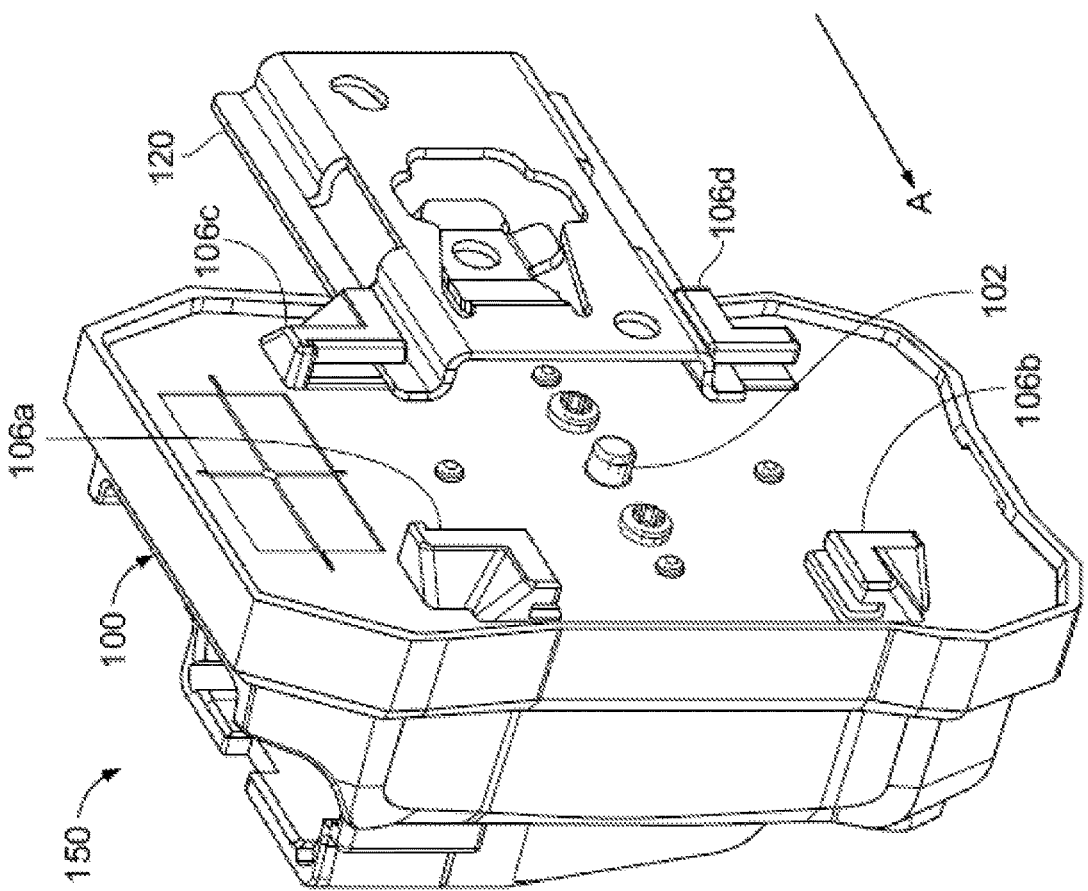
FIG. 15 is another illustration of the rail mounted assembly and mounting of the rail onto the controller housing, according to example implementations.

FIGS. 14-15 illustrate a rail mounted assembly 150 and mounting of the rail 120 onto the controller housing 100, according to example implementations. The rail mounted assembly 150 includes the controller housing 100 with the rail 120. As shown in FIGS. 14-15, the rail 120 can slide laterally (according to the direction shown by arrow A) into the guiding slot 108 of particular mounting guides 106a-d of the controller housing 100 for coupling the rail 120 to the controller housing 100. The flexible cutout tab 128 with the hole 130 slides over and engages with the locking post 102 when coupling the rail 120 to the controller housing 100 resulting in the locking post 102 being positioned in the hole 130 of the flexible cutout tab 128 to lock the rail 120 coupled to the controller housing 100. When sliding over, the flexible cutout tab 128 bends to snap over and onto the locking post 102, for example. Thus, the flexible cutout tab 128 includes flexibility to move and flex somewhat for insertion of the rail 120 into the controller housing 100.

FIGS. 14-15 show the rail 120 being inserted from right to left, however, the rail 120 can also be inserted from left to right as well. For example, the multiple mounting guides 106a-d enable the rail 120 to couple to the controller housing 100 in either of a lateral direction and a longitudinal direction.

Figure 17:
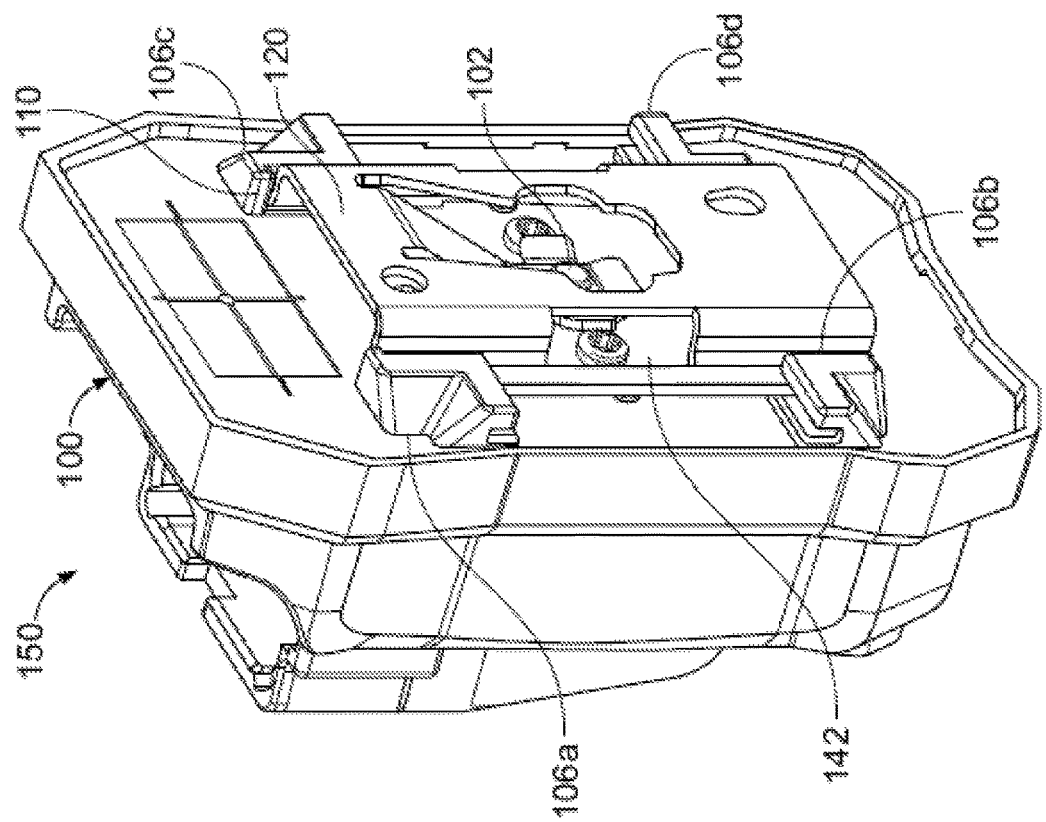
FIG. 17 is another illustration of the rail mounted assembly and mounting configuration of the rail onto the controller housing, according to example implementations.
Figure 16:
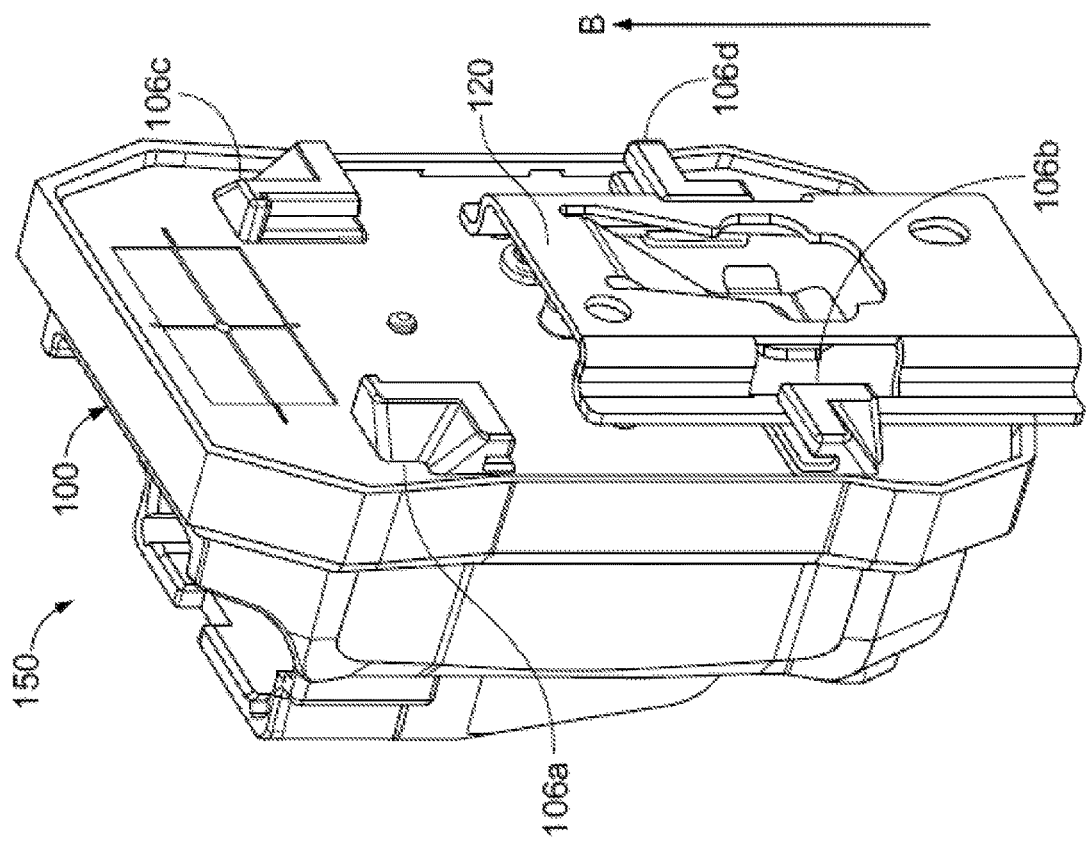
FIG. 16 illustrates the rail mounted assembly and another mounting configuration of the rail onto the controller housing, according to example implementations.

FIGS. 16-17 illustrate the rail mounted assembly 150 and another mounting configuration of the rail 120 onto the controller housing 100, according to example implementations. As shown in FIGS. 16-17, the rail 120 can slide longitudinally (according to the direction shown by arrow B) into the guiding slot 108 of particular mounting guides 106a-d of the controller housing 100 for coupling the rail 120 to the controller housing 100. The flexible cutout tab 128 with the hole 130 slides over and engages with the locking post 102 when coupling the rail 120 to the controller housing 100 resulting in the locking post 102 being positioned in the hole 130 of the flexible cutout tab 128 to lock the rail 120 coupled to the controller housing 100. FIGS. 16-17 show the rail 120 being inserted from bottom to top since the mounting guides 106a and 106c include the blocking lip 110, for example. Thus, using the configuration of the controller housing 100 shown in FIGS. 16-17, the rail 120 is permitted to slide laterally from either direction, and longitudinally from only one direction.

Figure 18:
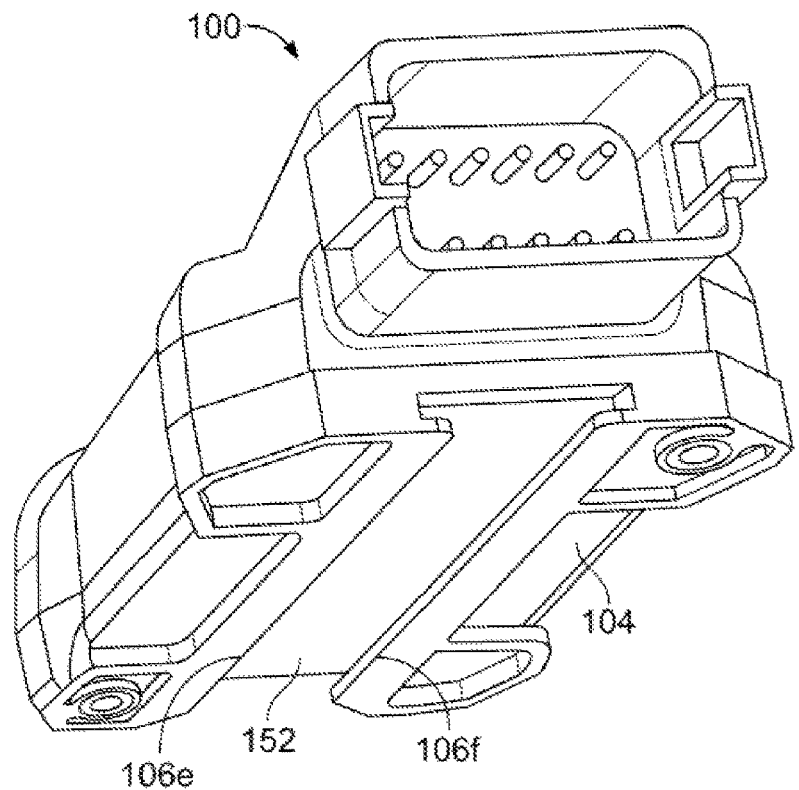
FIG. 18 illustrates an alternate configuration of the controller housing, according to an example implementation.

FIG. 18 illustrates an alternate configuration of the controller housing 100, according to an example implementation. In FIG. 18, two mounting guides 106e and 106f are shown on the base 104 of the controller housing 100. The mounting guides 106e and 106f are arranged to accommodate (or operate as a receptacle for) a DIN rail 152 between the mounting guides 106e and 106f, for example. The mounting guides 106e and 106f are arranged to be along a longitudinal direction, for example.

Figure 19:
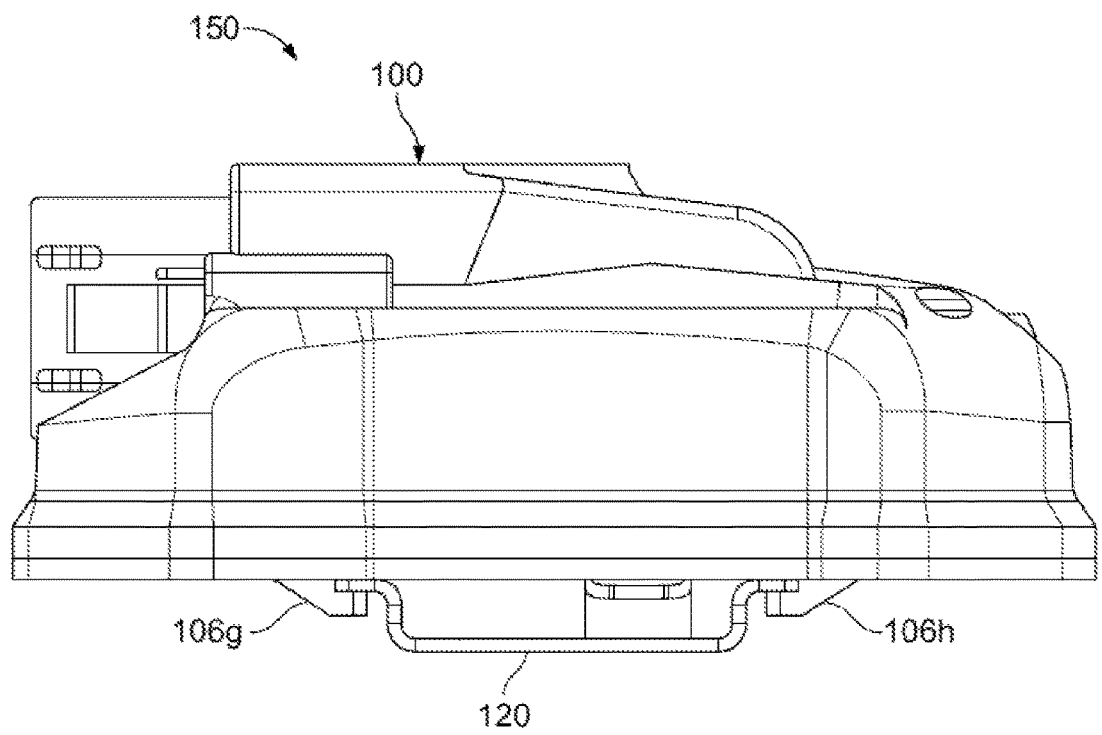
FIG. 19 illustrates another alternate configuration of the controller housing, according to an example implementation.

FIG. 19 illustrates another alternate configuration of the controller housing 100, according to an example implementation. In FIG. 19, two mounting guides 106g and 106h are shown on the base 104 of the controller housing 100. The mounting guides 106g and 106h are arranged to accommodate (or operate as a receptacle for) a DIN rail between the mounting guides 106g and 106h, for example. The mounting guides 106g and 106h are arranged to be along a lateral direction, for example.

Thus, as shown in FIGS. 18-19, the controller housing 100 can be arranged with two mounting guides that are arranged parallel to each other in either a lateral or longitudinal configuration, and this arrangement enables the rail 120 to couple to the controller housing 100 in one of a lateral direction and a longitudinal direction.

Figure 20:
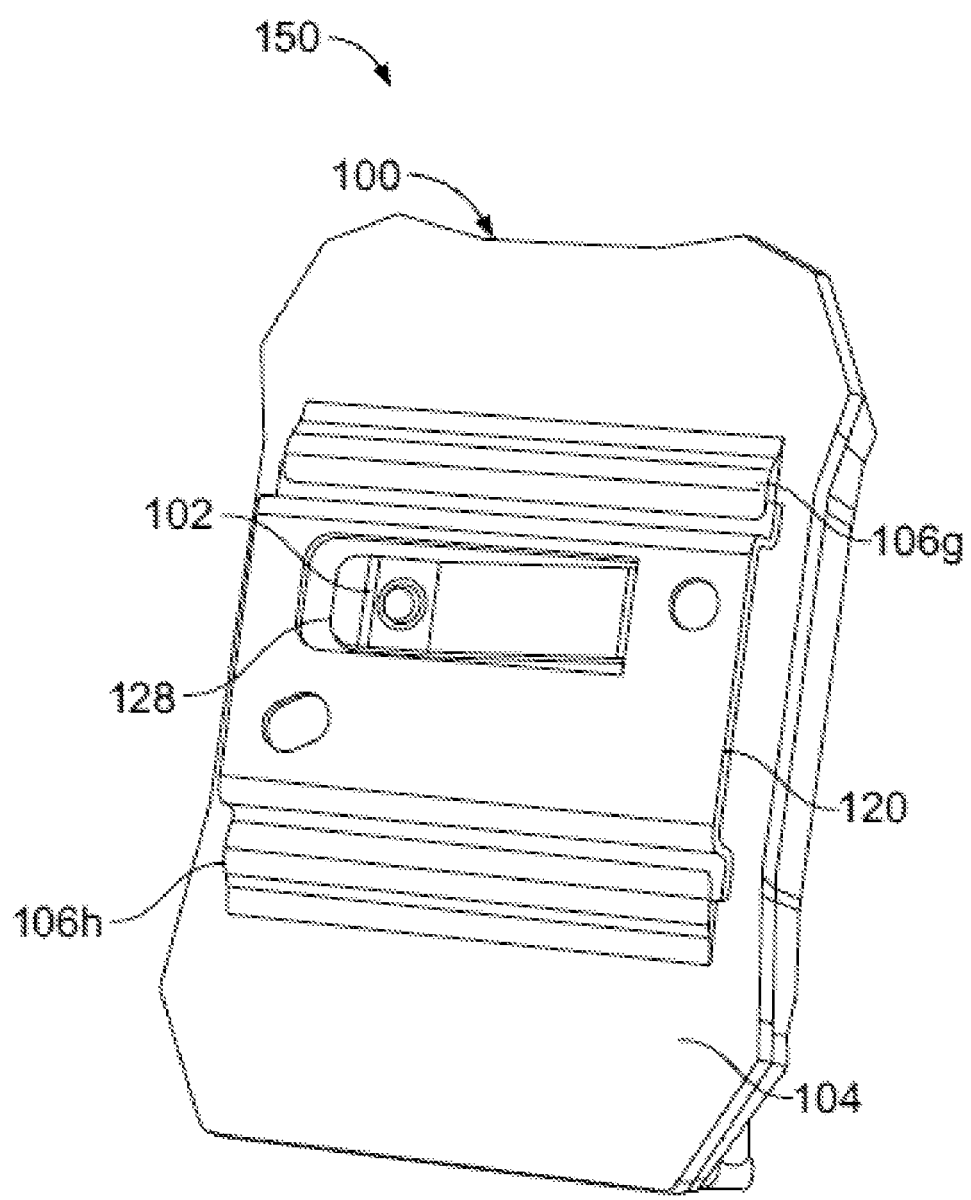
FIG. 20 illustrates another example of the rail mounted assembly, according to an example implementation.

FIG. 20 illustrates another example of the rail mounted assembly 150, according to an example implementation. In FIG. 20, the rail 120 is inserted between the mounting guides 106g and 106h in a lateral direction and the flexible cutout tab 128 slides over and engages with the locking post 102 of the controller housing 100.

Within FIGS. 14-20, the controller housing 100 is shown and described to include the locking post 102 and the rail 120 includes the flexible cutout tab 128 with the hole 130 for snapping over the locking post 102 and locking into position. In other examples, the controller housing 100 may include a locking feature, e.g., an opening or hole, into which a locking post positioned on the flexible cutout tab 128 slides into to secure the rail 120 into position. In either configuration, the rail 120 is secured to the controller housing 100 once fully inserted to prevent movement of the rail 120, for example. In addition, once secured to the controller housing 100, the locking feature of the controller housing 100 is aligned with the flexible cutout tab 128 of the rail 120 to lock the rail 120 coupled to the controller housing 100.

The rail mounted assembly 150 can be useful to mount the controller housing 100 to a solenoid coil or other electrical component in a compact manner. The solenoid coil can then be positioned proximate to the controller to reduce an amount of wiring needed, and to enable a direct mount configuration such that the controller housing mounts to a chassis or manifold on one side, and attaches to the solenoid coil on the other side.

In some examples, to attach the solenoid coil to the rail mounted assembly 150, additional brackets or clips may be used.

Figure 21:
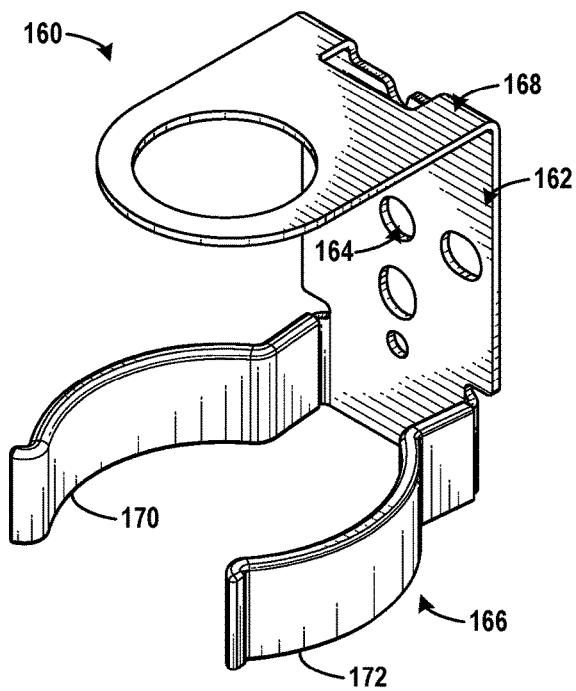
FIG. 21 is a downward perspective view from a left front corner of a coil mounting clip, according to an example implementation.
Figure 22:
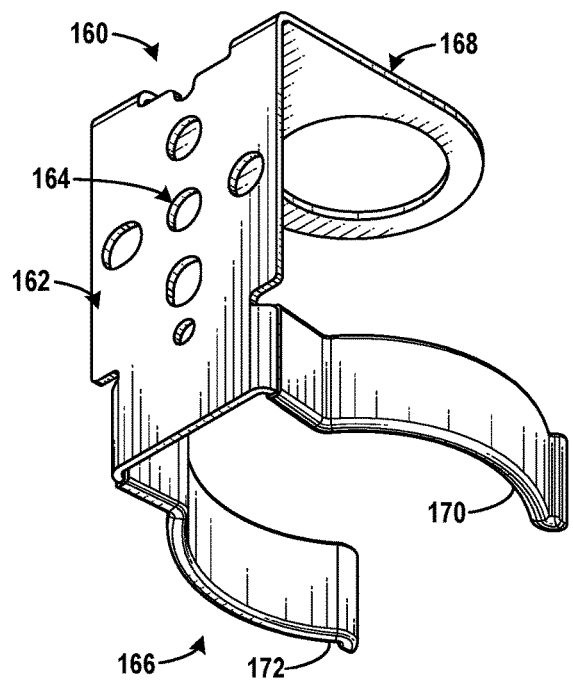
FIG. 22 is an upward perspective view from a right rear corner of the coil mounting clip, according to an example implementation.
Figure 23:
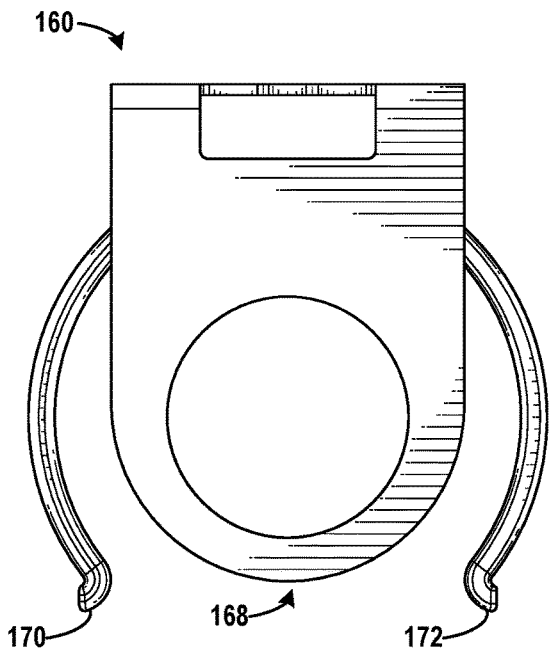
FIG. 23 is top plan view of the coil mounting clip, according to an example implementation.
Figure 24:
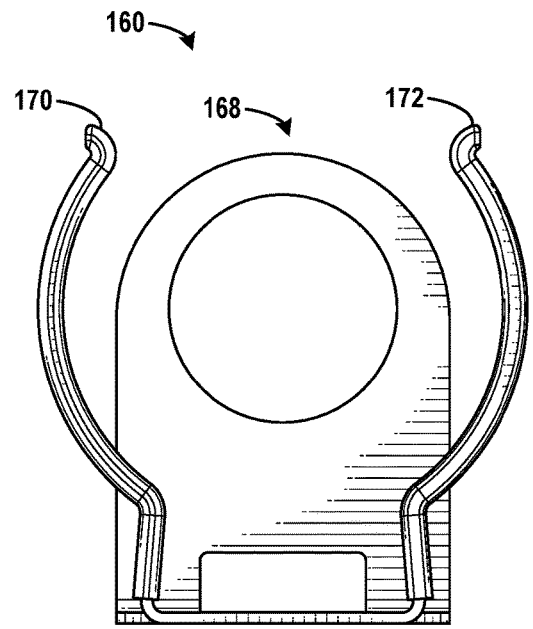
FIG. 24 is bottom plan view of the coil mounting clip, according to an example implementation.
Figure 25:
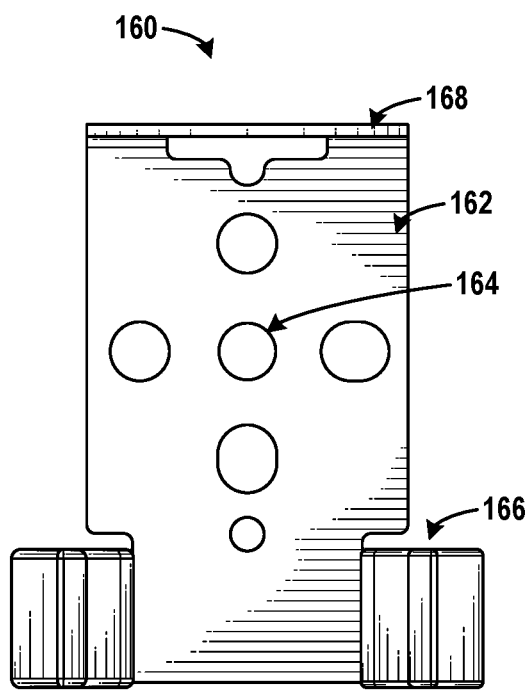
FIG. 25 is a front elevational view of the coil mounting clip, according to an example implementation.
Figure 26:
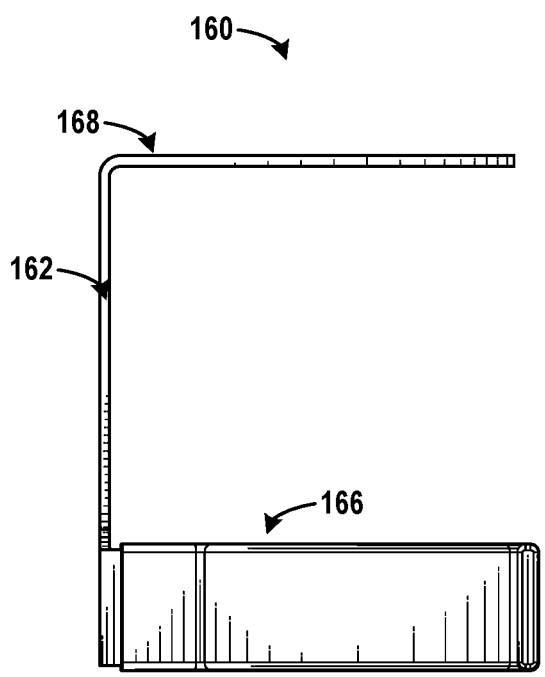
FIG. 26 is a right side elevational view of the coil mounting clip, according to an example implementation.

FIGS. 21-26 illustrate an example coil mounting bracket for use with the rail mounted assembly 150. For example, FIG. 21 is a downward perspective view from a left front corner of a coil mounting clip 160 according to an example implementation, FIG. 22 is an upward perspective view from a right rear corner of the coil mounting clip 160 according to an example implementation, FIG. 23 is top plan view of the coil mounting clip 160 according to an example implementation, FIG. 24 is bottom plan view of the coil mounting clip 160 according to an example implementation, FIG. 25 is a front elevational view of the coil mounting clip 160 according to an example implementation, and FIG. 26 is a right side elevational view of the coil mounting clip 160 (e.g., a left side elevational view is a mirror image of the right side elevational view according to an example implementation.

The coil mounting bracket 160 include a center portion 162 including a guiding hole 164, a flexible clip portion 166 for holding a coil, and a support 168 extending from a top of the center portion 162. The flexible clip portion 166 includes two arms 170 and 172 extending from a bottom of the center portion 162. The support 168 includes an opening as well.

The coil mounting bracket 160 may comprise plastic or metal. In one example, the flexible clip portion 166 is made of a different material from a remainder of the coil mounting bracket 160. For instance, the flexible clip portion 166 is configured to partially surround and hold a coil (e.g., a solenoid coil), and thus, it may be desired to have the two arms 170 and 172 be of a material other than metal so as to avoid scratching the coil and to avoid a possibility of rust/corrosion building over time. Thus, the flexible clip portion 166 can be plastic or an elastomeric dip or coating can be used in instances in which the coil mounting bracket 160 is an integral metal component to put a non-metal coating on the two arms 170 and 172, which also provides increased grip and eliminates metal to metal contact.

The coil mounting bracket 160 may be used with the controller housing 100 and/or the rail 120 to mount components, for example.

Figure 27:
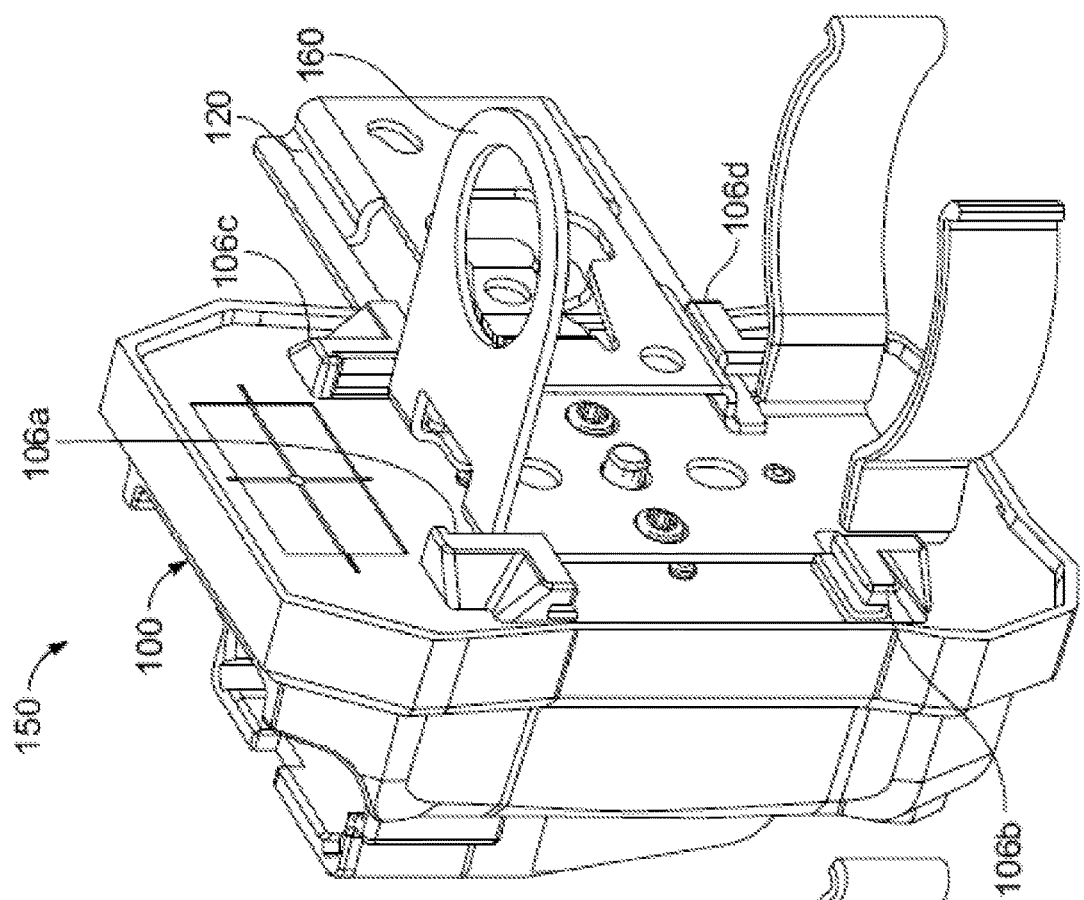
FIG. 27 illustrates the coil mounting bracket mounted to the controller housing, according to an example embodiment.

FIG. 27 illustrates the coil mounting bracket 160 mounted to the controller housing 100, according to an example embodiment. In FIG. 27, the guiding hole 164 of the coil mounting bracket 160 is positioned over the locking post 102 of the base 104 of the controller housing 100. In addition, screws 174 and 176 of the controller housing 100 can further be used for locating and positioning the coil mounting bracket 160 onto the controller housing 100 when the coil mounting bracket 160 has holes at corresponding positions, for example. The coil mounting bracket 160 may snap over the locking post 102, or simply fit over the locking post 102 loosely.

Figure 28:
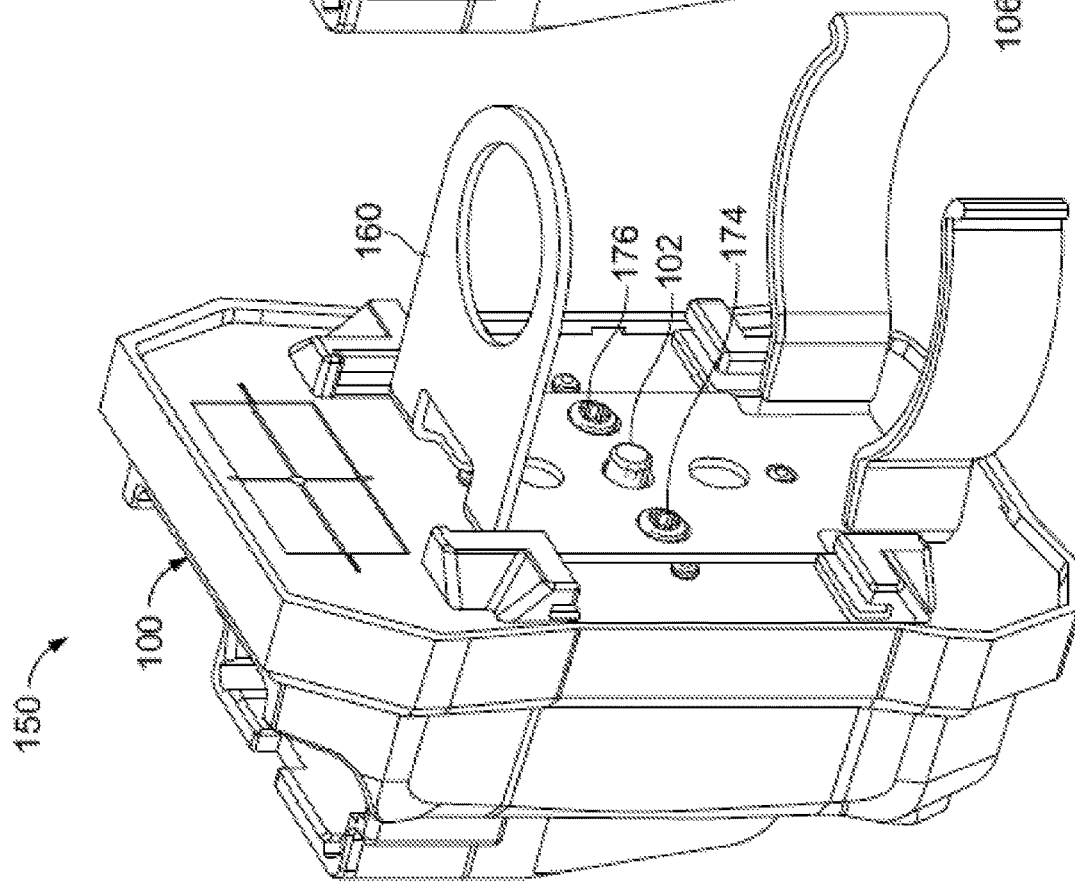
FIG. 28 illustrates the rail mounted assembly with the rail being inserted, according to an example embodiment.

FIG. 28 illustrates the rail mounted assembly 150 with the rail 120 being inserted, according to an example embodiment. In FIG. 28, the rail 120 is inserted by sliding into the mounting guides 106a-d and over the coil mounting bracket 160.

Figure 29:
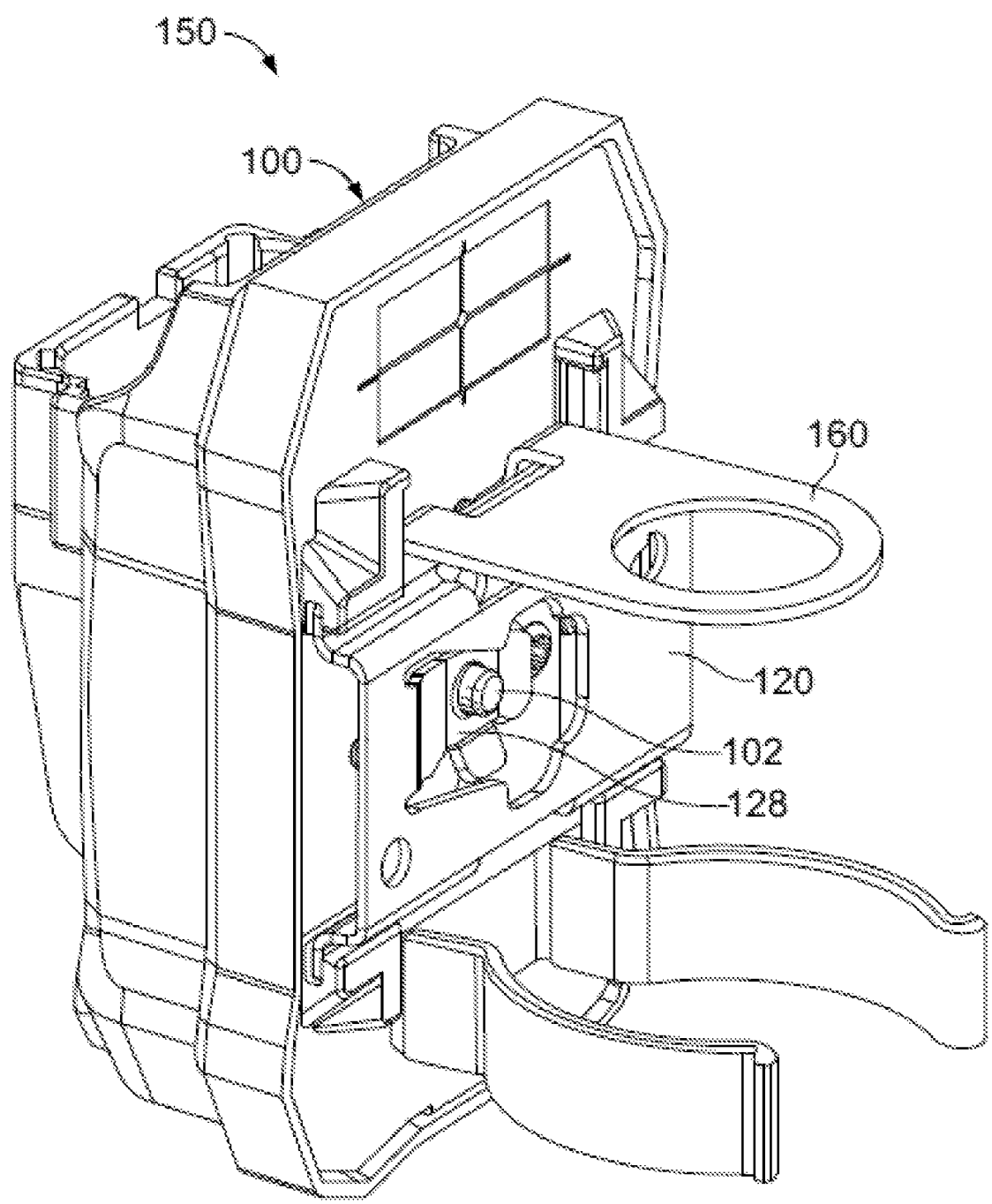
FIG. 29 illustrates the rail mounted assembly with the rail and coil mounting bracket installed, according to an example embodiment.

FIG. 29 illustrates the rail mounted assembly 150 with the rail 120 and coil mounting bracket 160 installed, according to an example embodiment. In FIG. 29, the rail 120 is fully inserted and locked into place with the flexible cutout tab 128 snapped over the locking post 102 of the controller housing 100. The coil mounting bracket 160 is positioned between the controller housing 100 and the rail 120, such that the rail 120 slides through respective guiding slots of the multiple mounting guides 106a-d and over the coil mounting bracket 160 to lock the coil mounting bracket 160 into position. The rail 120 contacts the center portion of the center portion 162 of the coil mounting bracket 160 to force the coil mounting bracket 160 against the base 104 of the controller housing 100.

Figure 30:
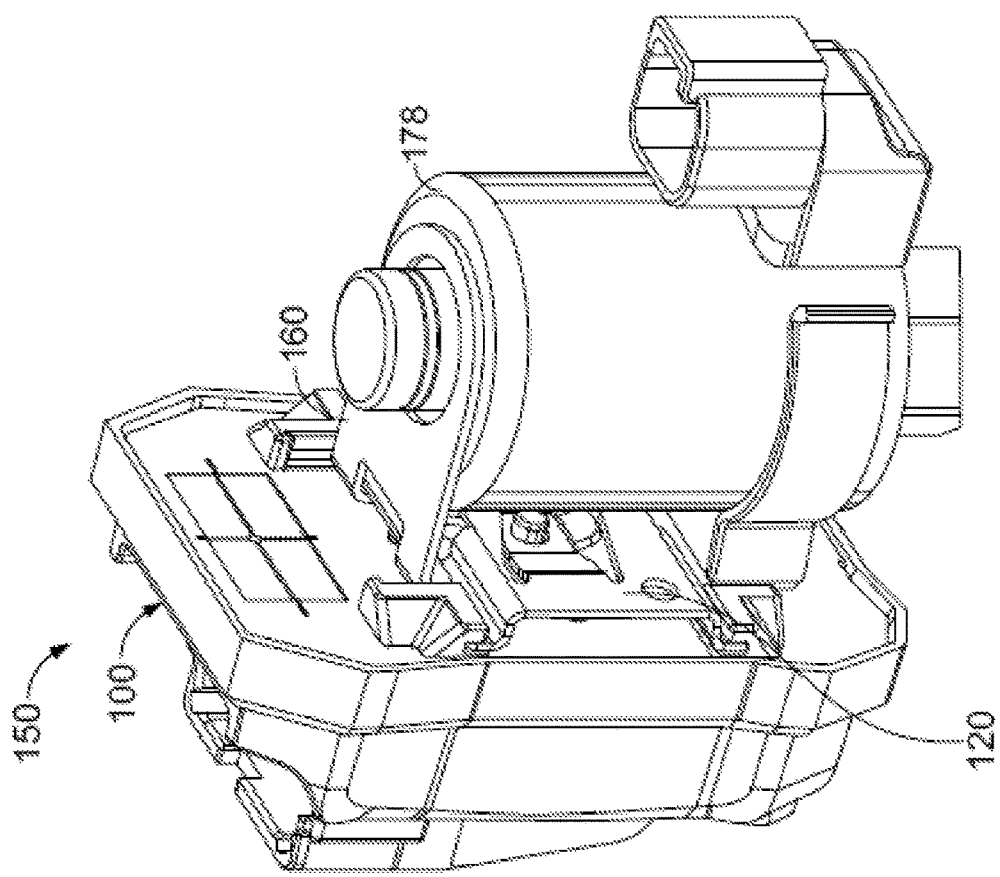
FIG. 30 illustrates the rail mounted assembly with a coil inserted into the coil mounting bracket, according to an example embodiment.

FIG. 30 illustrates the rail mounted assembly 150 with a coil 178 inserted into the coil mounting bracket 160, according to an example embodiment. In FIG. 30, the coil 178 is snapped into the coil mounting bracket 160 to be held in place. The two arms 170 and 172 wrap around a portion of the coil 178 to hold the coil 178, and a top of the coil is inserted through an opening in the support 168 of the coil mounting bracket 160. The coil 178 is shown as cylindrical, however, other coils with other geometries may be used and the arms 170 and 172 can be modified accordingly to hold the corresponding sized and shaped coil, for example.

Figure 31:
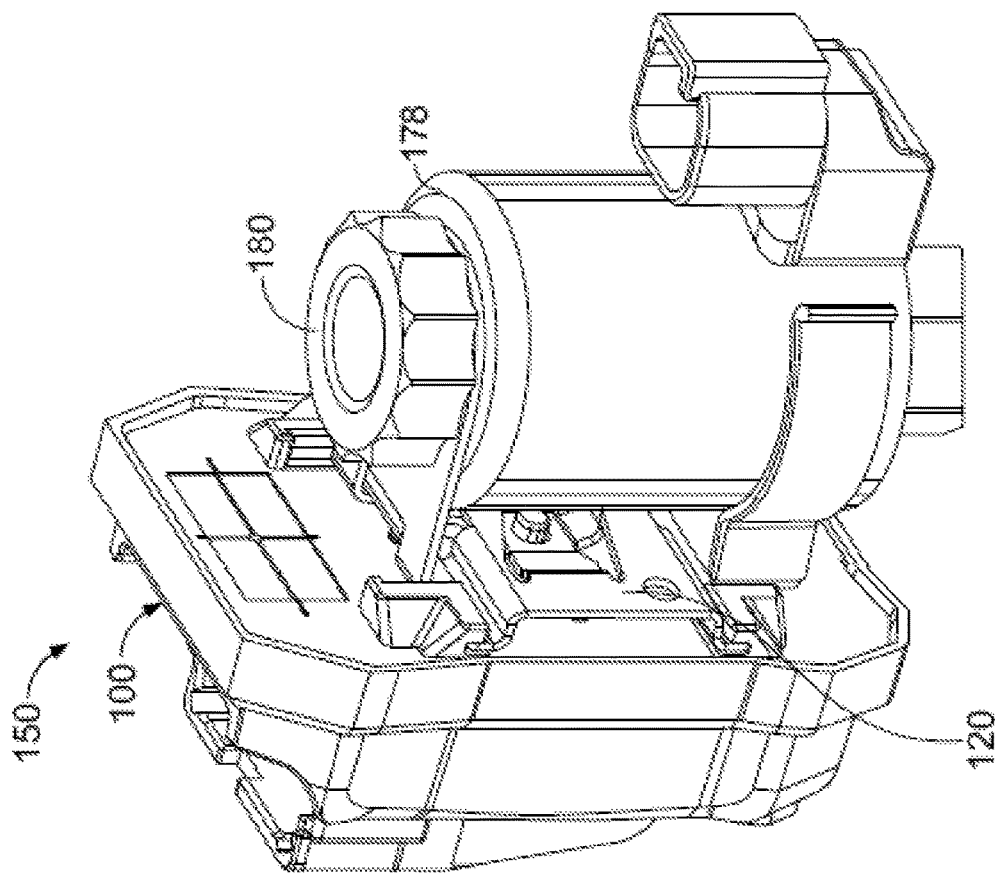
FIG. 31 illustrates the rail mounted assembly with the coil installed, according to an example embodiment.

FIG. 31 illustrates the rail mounted assembly 150 with the coil 178 installed, according to an example embodiment. The coil mounting bracket 160 can be sized to allow for some space or slop at a top of the coil mounting bracket 160 and the coil 178 so that the coil 178 can be easily inserted. An o-ring (not shown) can be used to secure the coil 178 in place, and a nut 180 can be used to tighten the coil 178 to the coil mounting bracket 160. Elastomeric washers can also be used on a top and/or bottom of the coil 178 to prevent scratching of the coil as well as to prevent metal-to-metal contact of the coil 178 and the coil mounting bracket 160. The nut 180 provides compression for retention and sealing on the elastomeric surfaces, for example.

Figure 32:
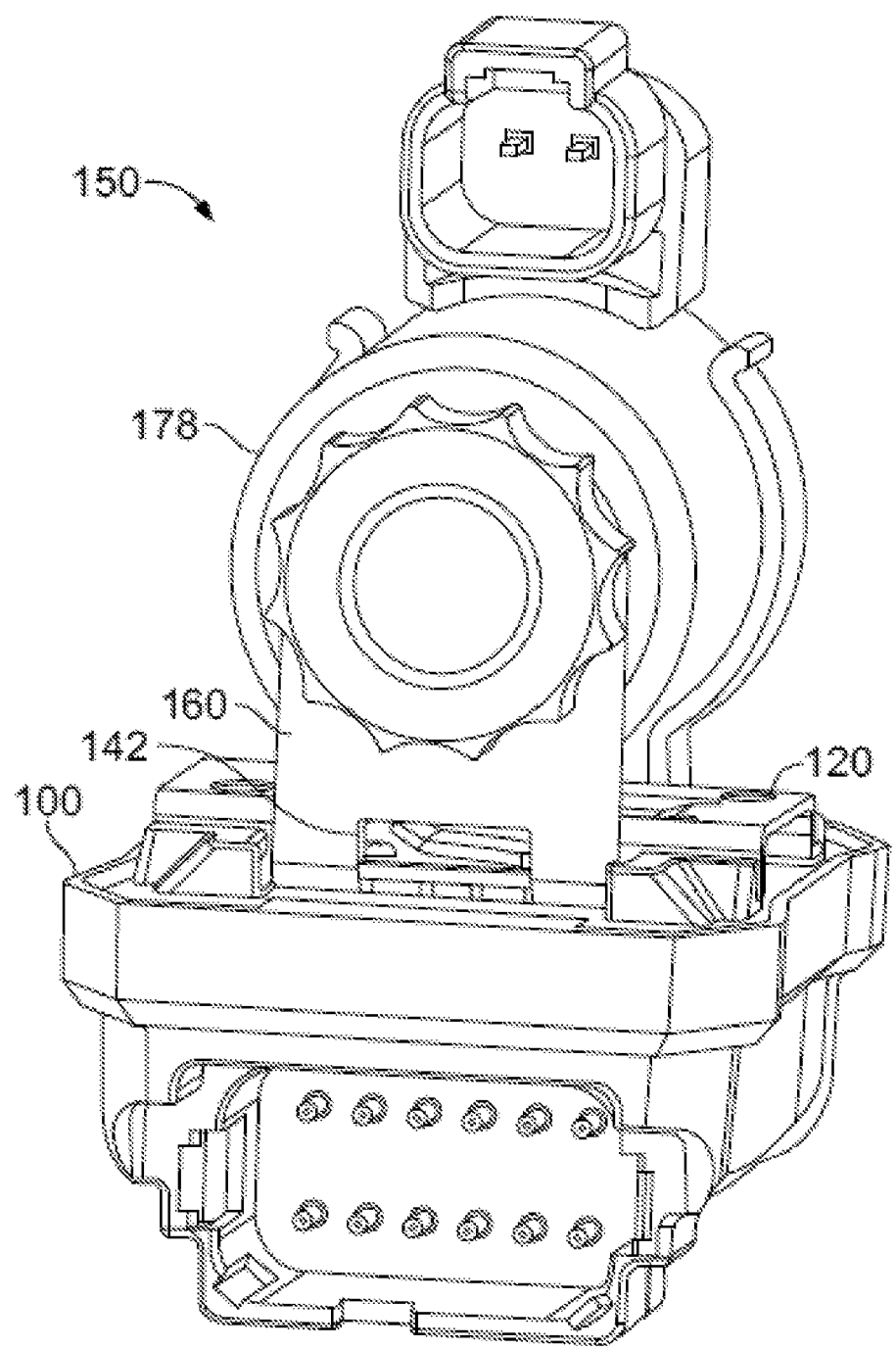
FIG. 32 illustrates a top view of the rail mounted assembly with the coil installed, according to an example embodiment.

FIG. 32 illustrates a top view of the rail mounted assembly 150 with the coil 178 installed, according to an example embodiment. In FIG. 32, the cutout 142 is shown which provides access to the flexible cutout tab 128. The flexible cutout tab 128 can be lifted up to disengage the rail 120 from the locking post 102 of the controller housing 100 allowing the rail 120 to slide off the controller housing 100, for example. This allows the coil mounting bracket 160 to be removable as well. Thus, the rail mounted assembly 150 provides an ability to unlatch the rail 120 from the controller housing 100 to remove the mounted components, for example, for easy replacement or maintenance of the components.

Although FIGS. 30-32 illustrate the rail 120 mounted laterally, the rail 120 may also be mounted longitudinally, which can enable multiple rail mounted assemblies 150 to be positioned proximate each other, for example, while still allowing access to unlatch the rail 120 for removal. For example, the rail 120 has the cutout 142, which is accessible through sides and/or the top and bottom of the rail mounted assembly 150 depending on whether the rail 120 is mounted laterally or longitudinally. Further, when the rail 120 is mounted laterally, as shown in FIGS. 30-32, the flexible cutout tab 128 can also be accessed through sides in addition to through the cutout 142. Similarly, when the rail 120 is mounted longitudinally, the flexible cutout tab 128 can be accessed through a top or bottom opening in addition to through the cutout 142.

FIGS. 33-36 illustrate another example configuration of the rail mounted assembly 150 with the rail 120 and the coil mounting bracket 160 being installed, according to an example embodiment. In FIGS. 33-36, the rail 120 and the coil mounting bracket 160 are a single or integral component 182.

Figure 34:
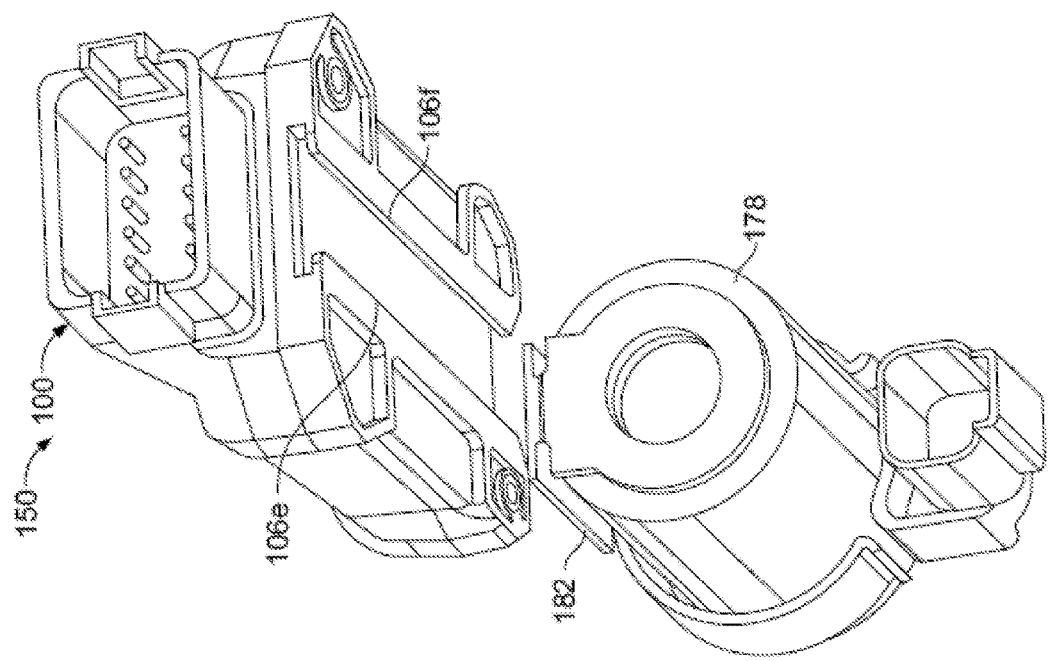
FIG. 34 illustrates a top view of the rail mounted assembly with the integral component being inserted, according to an example embodiment.
Figure 33:
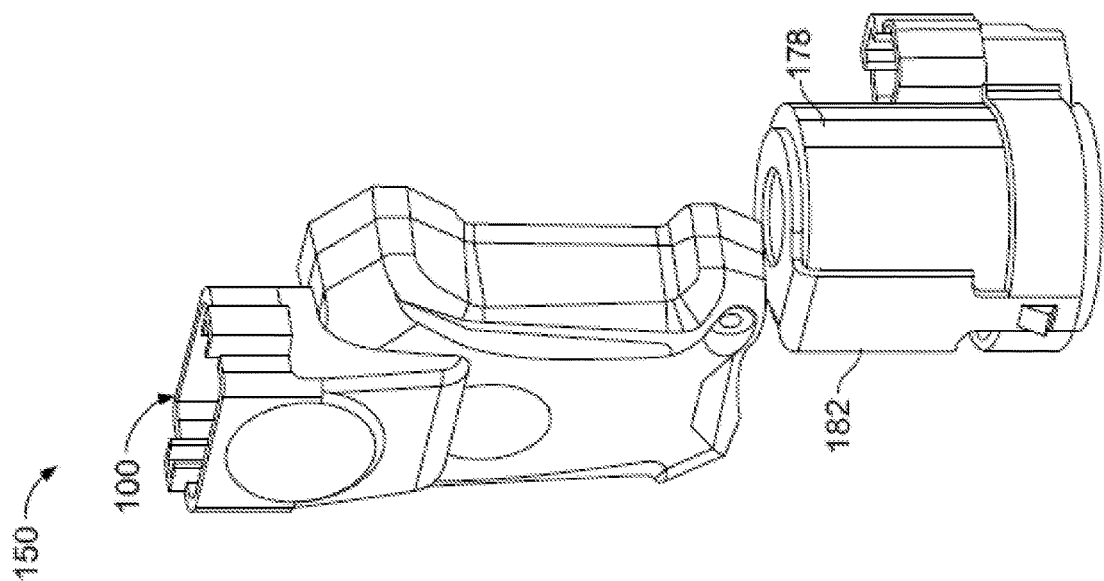
FIG. 33 illustrates a side view of the rail mounted assembly with the integral component being inserted, according to an example embodiment.

FIG. 33 illustrates a side perspective view of the rail mounted assembly 150 with the integral component 182 being inserted according to an example embodiment, and FIG. 34 illustrates a top perspective view of the rail mounted assembly 150 with the integral component 182 being inserted according to an example embodiment. In this example, the integral component 182 is inserted longitudinally into the controller housing 100. The integral component 182 provides an interface between the controller housing 100 and the coil 178 to facilitate mounting the coil 178 to the controller housing 100. The controller housing 100 has a dove-tail configuration integrated into the base 104 of the controller housing 100 using the mounting guides 106e and 106f, and the integral component 182 attaches to the coil 178 and has a corresponding dove-tail portion that slides up through the dove-tail of the controller housing 100 to be attached thereto.

FIG. 35 illustrates a side perspective view of the rail mounted assembly 150 with the integral component 182 inserted, according to an example embodiment. The coil 178 is shown inserted into the integral component 182 as well.

FIG. 36 illustrates a side perspective view of the rail mounted assembly 150 with the integral component 182 inserted, according to an example embodiment. In FIG. 36, the integral component 182 is configured for mounted to the controller housing 100 in a lateral direction, for example.

In the examples shown in FIGS. 33-36, the rail 120 and the coil mounting bracket 160 are provided by the integral component 182, and the integral component 182 may be a single piece of metal. The rail 120 and the coil mounting bracket 160 functionality are provided by the integral component 182, and thus, the integral component 182 may include a combination of all features of the rail 120 and the coil mounting bracket 160, such as the flexible cutout tab 128 to secure the integral component 182 to a locking post (not shown) on the controller housing 100.

FIG. 37 shows a flowchart of an example method 200 of securing and releasing components of the rail mounted assembly 150, according to an example implementation. Method 200 shown in FIG. 37 presents an example of a method that could be used with the rail mounted assembly 150, shown throughout the Figures, for example. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation. It should be understood that for this and other processes and methods disclosed herein, flowcharts show functionality and operation of one possible implementation of present examples. Alternative implementations are included within the scope of the examples of the present disclosure in which functions may be executed out of order from that shown or discussed, including substantially concurrent or in reverse order, depending on the functionality involved, as would be understood by those reasonably skilled in the art.

At block 202, the method 200 includes providing the controller housing 100 having the locking post 102 extending from the base 104 of the controller housing 100 and multiple mounting guides 106a-d extending from the base 104 of the controller housing 100. Each mounting guide 106a-d includes the guiding slot 108. The term "providing" as used herein with regard to the controller housing 100 includes any action to make the controller housing 100 available for use, such as bringing the controller housing 100 to an apparatus or to a work environment for further processing of the controller housing 100 (e.g., mounting other components, etc.

At block 204, the method 200 includes sliding the side portions 124 and 126 of the rail 120 into respective guiding slots of the mounting guides 106a-d of the controller housing 100 for coupling the rail 120 to the controller housing 100. Each side portion 124 and 126 of the rail 120 is coupled to a particular side of the center portion 122 and forms an L-shaped edge.

At block 206, the method 200 includes sliding the flexible cutout tab 128 of the center portion 122 of the rail 120 over the locking post 102 when coupling the rail 120 to the controller housing 100 resulting in the locking post 102 being positioned in the hole 130 of the flexible cutout tab 128 to lock the rail 120 coupled to the controller housing 100. Thus, the locking post 102 snaps into the hole 130 of the flexible cutout tab 128.

At block 208, the method 200 includes releasing the rail 120 from the controller housing 100 by accessing the flexible cutout tab 128 through the cutout 142 of at least one of the two side portions 124 and 126 of the rail 120. After releasing the rail 120, the rail 120 can be slid out of the controller housing 100 and removed from the controller housing 100.

FIG. 38 shows a flowchart of additional functions that may be executed and performed with the method 200 of securing and releasing components of the rail mounted assembly 150, according to an example implementation. At block 210, functions include lifting one or more wings 136, 138, and 140 of the flexible cutout tab 128 of the center portion 122 of the rail 120 which are arranged at an angle toward an underside surface of the center portion 122 to disengage the locking post 102 from the hole 130 of the flexible cutout tab 128.

FIG. 39 shows a flowchart of additional functions that may be executed and performed with the method 200 of securing and releasing components of the rail mounted assembly 150, according to an example implementation. At block 212, functions include positioning the coil mounting bracket 160 with the guiding hole 164 over the locking post 102 of the base 104 of the controller housing 100. The coil mounting bracket 160 is positioned between the multiple mounting guides 106a-d and between the controller housing 100 and the rail 120, such that the rail 120 slides through respective guiding slots of the multiple mounting guides 106a-d and over the coil mounting bracket 160 to lock the coil mounting bracket 160 into position. The coil mounting bracket 160 can be positioned over the controller housing 100 prior to sliding the rail 120 into the mounting guides 106a-d of the controller housing 100, for example. Thus, for insertion, the coil mounting bracket 160 is inserted first, followed by the rail 120. Then, for removal, the rail 120 is removed first, which enables the coil mounting bracket 160 to then be removed.

By the term "substantially" used herein, it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Different examples of the system(s), device(s), and method(s) disclosed herein include a variety of components, features, and functionalities. It should be understood that the various examples of the system(s), device(s), and method(s) disclosed herein may include any of the components, features, and functionalities of any of the other examples of the system(s), device(s), and method(s) disclosed herein in any combination, and all of such possibilities are intended to be within the scope of the disclosure.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A rail mounted assembly, comprising:
a controller housing having a locking feature on a base of the controller housing and multiple mounting guides extending from the base of the controller housing, wherein each mounting guide includes a guiding slot; and
a rail having two side portions and a center portion therebetween, wherein each side portion is coupled to a particular side of the center portion and forms an L-shaped edge and wherein each side portion is configured to slide into the guiding slot of a particular mounting guide of the controller housing for coupling the rail to the controller housing, and wherein the center portion includes a flexible cutout tab for sliding over and engaging with the locking feature when coupling the rail to the controller housing resulting in the locking feature being aligned with the flexible cutout tab to lock the rail coupled to the controller housing.

2. The rail mounted assembly of claim 1, wherein the multiple mounting guides with respective guiding slots conform to the Deutsches Institut für Normung (DIN) standard.

3. The rail mounted assembly of claim 1, wherein each mounting guide includes two portions coupled together in an L-shape and each of the two portions includes a respective guiding slot.

4. The rail mounted assembly of claim 1, wherein the multiple mounting guides include at least four mounting guides arranged at corners of a square or rectangular configuration, and wherein the multiple mounting guides enable the rail to couple to the controller housing in either of a lateral direction and a longitudinal direction.

5. The rail mounted assembly of claim 1, wherein each mounting guide includes two portions coupled together in an L-shape and each of the two portions includes a respective guiding slot, and wherein the multiple mounting guides enable the rail to couple to the controller housing in either of a lateral direction and a longitudinal direction such that the side portions of the rail slide into the respective guiding slot of one of the two portions of the L-shape mounting guide.

6. The rail mounted assembly of claim 5, wherein two of the mounting guides have a blocking lip such that the rail is permitted to slide laterally from either direction, and longitudinally from only one direction.

7. The rail mounted assembly of claim 1, wherein the multiple mounting guides include at least two mounting guides arranged parallel to each other, and wherein the multiple mounting guides enable the rail to couple to the controller housing in one of a lateral direction and a longitudinal direction.

8. The rail mounted assembly of claim 1, wherein at least one of the two side portions of the rail includes a cutout enabling access to the flexible cutout tab.

9. The rail mounted assembly of claim 1, wherein the flexible cutout tab of the center portion is arranged at an angle away from an underside surface of the center portion and toward the base of the controller housing.

10. The rail mounted assembly of claim 1, wherein the two side portions, the center portion, and the flexible cutout tab of the center portion of the rail are all formed from an integral piece of material.

11. The rail mounted assembly of claim 1, wherein the flexible cutout tab of the center portion of the rail includes one or more wings arranged at an angle toward an underside surface of the center portion, wherein the rail is releasable from the controller housing by lifting the one or more wings to disengage the locking feature from the flexible cutout tab.

12. The rail mounted assembly of claim 1, wherein the flexible cutout tab of the center portion comprises:
an angled portion arranged at an angle away from an underside surface of the center portion and toward the base of the controller housing;
a flat tab including a hole for sliding over the locking feature, wherein the flat tab is connected to an end of the angled portion; and
one or more wings connected to the flat tab and arranged at an angle toward the underside surface of the center portion.

13. The rail mounted assembly of claim 1, further comprising:
a coil mounting bracket with a guiding hole positioned over the locking feature of the base of the controller housing, wherein the coil mounting bracket is positioned between the multiple mounting guides.

14. The rail mounted assembly of claim 13, wherein the coil mounting bracket is positioned between the controller housing and the rail, such that the rail slides through respective guiding slots of the multiple mounting guides and over the coil mounting bracket to lock the coil mounting bracket into position.

15. The rail mounted assembly of claim 13, wherein the coil mounting bracket comprises:
a center portion including the guiding hole;
a flexible clip portion for holding a coil, wherein the flexible clip portion includes two arms extending from a bottom of the center portion; and
a support extending from a top of the center portion.

16. A rail for a mounted assembly, comprising:
a center portion including a flexible cutout tab with a hole for sliding over a locking post when coupling the rail to a controller housing to lock the rail coupled to the controller housing, wherein the flexible cutout tab of the center portion includes (i) an angled portion arranged at an angle away from an underside surface of the center portion, (ii) a flat tab including the hole for sliding over the locking post, wherein the flat tab is connected to an end of the angled portion, and (iii) one or more wings connected to the flat tab and arranged at an angle toward the underside surface of the center portion, wherein the center portion is releasable from the controller housing by lifting the one or more wings to disengage the locking post from the hole of the flexible cutout tab; and
two side portions, wherein each side portion is coupled to a particular side of the center portion and forms an L-shaped edge, and wherein each side portion is configured to slide into a guiding slot of a particular mounting guide of the controller housing for coupling the rail to the controller housing, wherein at least one of the two side portions of the rail includes a cutout enabling access to the flexible cutout tab.

17. The rail of claim 16, wherein the two side portions, the center portion, and the flexible cutout tab of the center portion are all formed from an integral piece of material.

18. A method of securing and releasing components of a rail mounted assembly, the method comprising:
providing a controller housing having a locking post extending from a base of the controller housing and multiple mounting guides extending from the base of the controller housing, wherein each mounting guide includes a guiding slot;

sliding side portions of a rail into respective guiding slots of the mounting guides of the controller housing for coupling the rail to the controller housing, wherein each side portion of the rail is coupled to a particular side of a center portion and forms an L-shaped edge;

sliding a flexible cutout tab of the center portion of the rail over the locking post when coupling the rail to the controller housing resulting in the locking post being positioned in a hole of the flexible cutout tab to lock the rail coupled to the controller housing; and releasing the rail from the controller housing by accessing the flexible cutout tab through a cutout of at least one of the side portions of the rail.

19. The method of claim 18, further comprising lifting one or more wings of the flexible cutout tab of the center portion of the rail which are arranged at an angle toward an underside surface of the center portion to disengage the locking post from the hole of the flexible cutout tab.

20. The method of claim 18, further comprising:

positioning a coil mounting bracket with a guiding hole over the locking post of the base of the controller housing, wherein the coil mounting bracket is positioned between the multiple mounting guides and between the controller housing and the rail, such that the rail slides through respective guiding slots of the multiple mounting guides and over the coil mounting bracket to lock the coil mounting bracket into position.

* * * * *